US008612599B2

(12) United States Patent
Tung et al.

(10) Patent No.: US 8,612,599 B2
(45) Date of Patent: Dec. 17, 2013

(54) CLOUD SERVICE MONITORING SYSTEM

(75) Inventors: Teresa Tung, San Jose, CA (US); Farzana Badruddoja, Burr Ridge, IL (US); Jaeyoung C. Kang, Los Angeles, CA (US)

(73) Assignee: Accenture Global Services Limited, Dublin (IE)

( * ) Notice: Subject to any disclaimer, the term of this patent is extended or adjusted under 35 U.S.C. 154(b) by 40 days.

(21) Appl. No.: 13/227,412

(22) Filed: Sep. 7, 2011

(65) Prior Publication Data
US 2013/0060933 A1 Mar. 7, 2013

(51) Int. Cl.
*G06F 15/16* (2006.01)

(52) U.S. Cl.
USPC .......................... 709/226; 709/224; 709/228

(58) Field of Classification Search
USPC ................................. 709/223, 224, 225, 226
See application file for complete search history.

(56) References Cited

U.S. PATENT DOCUMENTS

| | | | | |
|---|---|---|---|---|
| 7,287,072 | B1* | 10/2007 | Dispensa et al. | 709/224 |
| 7,996,455 | B2* | 8/2011 | Jackson | 709/200 |
| 8,073,721 | B1* | 12/2011 | Lewis | 705/7.12 |
| 8,150,972 | B2* | 4/2012 | Jackson | 709/226 |
| 8,359,223 | B2* | 1/2013 | Chi et al. | 705/7.22 |
| 8,413,155 | B2* | 4/2013 | Jackson | 718/104 |
| 2006/0288251 | A1* | 12/2006 | Jackson | 714/19 |
| 2007/0240161 | A1 | 10/2007 | Prabhakar et al. | |
| 2007/0266388 | A1* | 11/2007 | Jackson | 718/104 |
| 2008/0320482 | A1 | 12/2008 | Dawson et al. | |
| 2009/0012930 | A1* | 1/2009 | Jackson | 707/2 |
| 2009/0043888 | A1* | 2/2009 | Jackson | 709/225 |
| 2010/0050172 | A1 | 2/2010 | Ferris | |
| 2011/0138056 | A1* | 6/2011 | Jackson | 709/226 |
| 2011/0145392 | A1 | 6/2011 | Dawson et al. | |
| 2011/0296029 | A1* | 12/2011 | Jackson | 709/226 |
| 2012/0022910 | A1* | 1/2012 | Chi et al. | 705/7.22 |
| 2012/0089726 | A1* | 4/2012 | Doddavula | 709/224 |
| 2012/0096165 | A1* | 4/2012 | Madduri et al. | 709/226 |
| 2012/0109873 | A1* | 5/2012 | Xiong et al. | 706/52 |

FOREIGN PATENT DOCUMENTS

WO    WO 2005/091136 A2    9/2005

OTHER PUBLICATIONS

European Patent Office Communication dated Oct. 24, 2012 for co-pending European Patent Office Patent Application No. 12 18 3001.2.

* cited by examiner

*Primary Examiner* — Douglas Blair
(74) *Attorney, Agent, or Firm* — Brinks Gilson & Lione

(57) ABSTRACT

A cloud services monitoring system (CSMS) helps a consumer of cloud computing resources determine the state of the cloud computing resources available to the consumer. The CSMS is particularly effective for cloud models where the consumer of the cloud computing resources is not the same as the provider of the cloud resource. The CSMS 102 also provides mechanisms for adjusting operations actions to preserve service guarantees for the consumer. In that regard, the CSMS dynamically adjusts operations actions in response to the state of the cloud, rather than executing fixed pre-determined operations actions that are not tailored to the monitored conditions.

21 Claims, 19 Drawing Sheets

CLOUD SERVICE MONITORING SYSTEM

TECHNICAL FIELD

The present description relates to determining the state of cloud computing resources available to a consumer. This description also relates to adjusting operations actions based on the state of the cloud computing resources to preserve service guarantees for the consumer.

BACKGROUND

Organizations' use of information technology (IT) and infrastructure computing resources are moving away from a static environment to a more dynamic and fluid computing environment. Traditionally, organizations' computing resources existed on fixed infrastructure owned by the organization and controlled directly by the organization. However, with the virtualization of computing resources, and shared computing environments (e.g., cloud computing), a computing resource consumer's application and computing service requests may reside on and use a variety of dynamic virtual systems and resources, and use any number of service providers to meet the users service-level agreements (SLAs).

Traditionally, the application owner also owned the computing infrastructure so that the same entity managed and maintained the data center. The data center assigns the consumer's application to a particular set of computing resources (e.g., particular computing clusters) in a physical data center. Even when the required number of nodes scales, particular nodes assigned at any time come from one to the allocated set of nodes. In a virtualized, cloud computing environment, the user can scale the user's resource utilization across multiple computing environments and service providers, no longer tied to a fixed number of nodes in a particular cluster or particular data center.

Infrastructure as a service and platform as a service, as provided by cloud computing service providers, provides a user a set of resources, similar to set up virtual machines of different computing sizes, capacity and throughput rates. For example, a small instance may be configured with limited processing resources, and a large instance would have relatively or processing resource capabilities. Traditionally, where the user also owned the computing environment, the user had direct native access to resource utilization and performance information, and access to all the monitoring metrics and logging information output from the user's computing environment. In contrast to service providers today, scientific research computing environments, for example where a national organization may host the computing environment for researchers, the researchers may be provided direct access to performance information regarding the physical infrastructure that may affect the researcher's computing utilization.

In a shared computing environment, a user's application is decoupled from the infrastructure environment so that the user may no longer have native visibility into the infrastructure to monitor and control performance of the application. Because users now have the ability to decouple the user's application from the native computing environment (infrastructure) and deploy the application in a dynamic virtual cloud computing environment, users no longer have native visibility into the state of the cloud computing environment provided by the third-party service providers. The cloud computing service provider (e.g., Amazon cloud watch) may provide hooks to provide passive instrumentation or views into the computing environment so that the user may monitor metrics regarding the computing resources used by the user's application (e.g., virtual machines, CPU usage, memory usage, the number of reads and writes performed for an application by the user's assigned virtual machine). However, although the user's virtual resources coexists with any number of other virtual resources used by other users on the same physical infrastructure (e.g., multi-tenant, multi-class users), the service provider does not provide the user the ability to realize the actual state of the computing environment. For example, virtual machines on the same physical cluster of servers impact each other as they consume shared resources like CPU, memory, network, and disk, but a virtual machine cannot directly view the use of other virtual machines. Also, as another example the read and write access of storage volumes on the same physical disk impact each other, and communication streams sharing the same network. The user in the shared environment sees only the activity of user's assigned virtual resources, but not the environment in total in order to understand how the consumption of other virtual resources and processes running in the shared environment are impacting the user specifically. When the user observes performance degradation that the user cannot account for given the passive monitoring provided by the service provider, the user has no way to understand the actual impact of other users coexisting in the cloud computing environment affecting the user.

SUMMARY

The cloud service monitoring system (CSMS) includes a processor, a memory coupled to the processor and a communications interface in communication with a shared services environment via a network (e.g., the Internet). The CSMS memory includes processor executable instructions that identify a service level agreement (SLA) rule configured to execute in order to meet a SLA requirement for a consumer of cloud resources provided by a cloud computing environment. The CSMS observes the cloud computing environment by the CSMS receiving passive measurements from the environment (e.g., from the service provider or another source), and actively probing the environment to determine state information for the cloud computing environment. The CSMS determines when the state information indicates that the SLA requirement is at risk of noncompliance, and in response, the CSMS dynamically adjusts the SLA rule to increase expectation of compliance of the SLA requirement.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
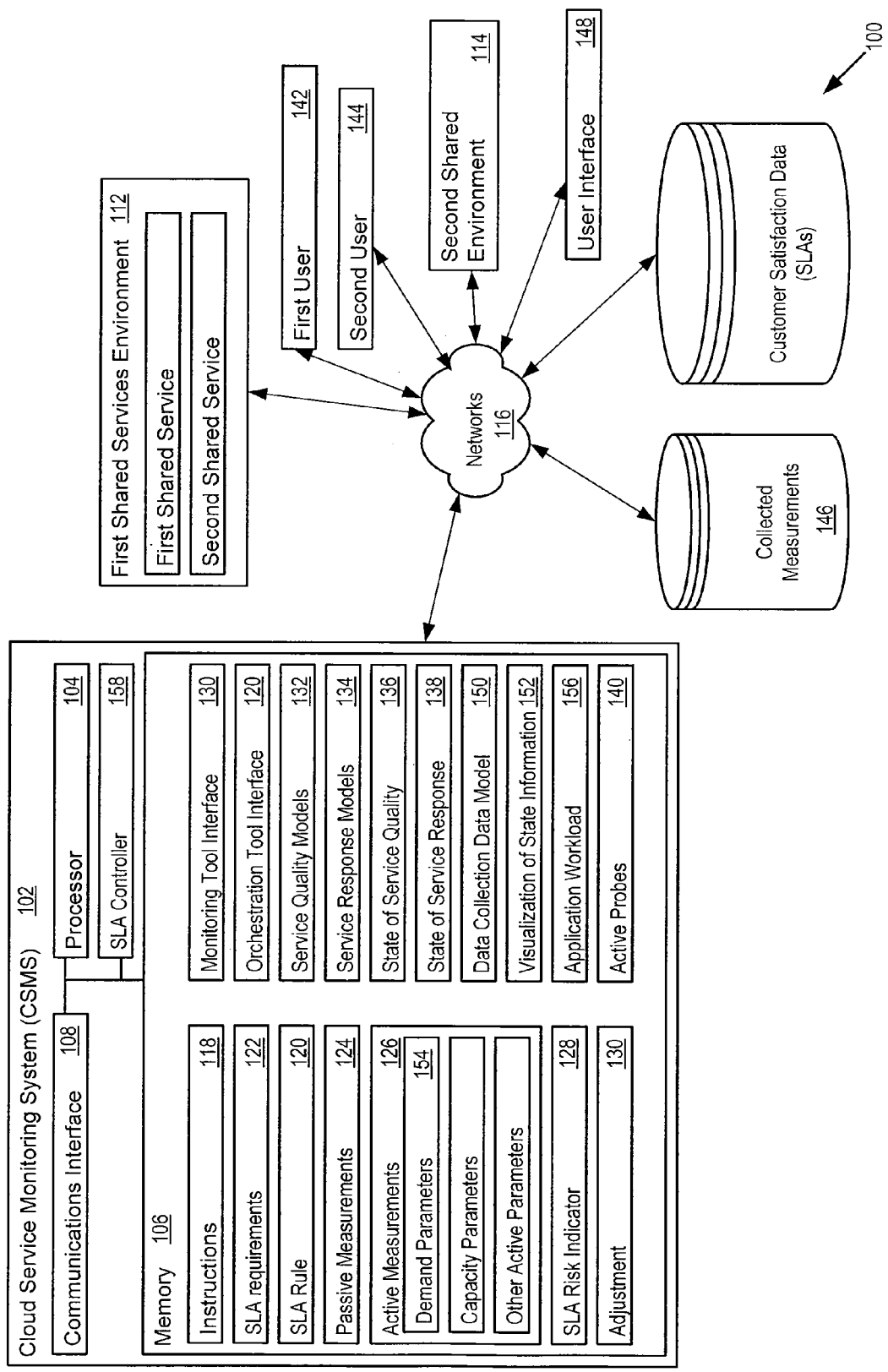
FIG. 1 shows a cloud service monitoring system (CSMS) configuration.

FIG. 1 shows a cloud service monitoring system (CSMS) configuration 100. The CSMS 102 configuration 100 includes a cloud service monitoring system (CSMS 102) 102 that includes a processor 104, a memory 106 coupled to the processor 104 and a communications interface 108 in communication with a shared services environment (112, 114) via a network 116 (e.g., the Internet). The CSMS 102 memory 106 includes processor executable instructions 118 that identify a service level agreement (SLA) rule 120 configured to execute in order to meet a SLA requirement 122 for a consumer of cloud resources provided by a cloud computing environment (112, 114). The CSMS 102 observes the cloud computing environment (112, 114) by the CSMS 102 receiving passive measurements 124 from the environment (e.g., from the service provider or another source). The user (142, 144) may merely listen to the environment and/or be provided with measurements specific to the user in a passive data collection mode. The CSMS 102 also observes the cloud computing environment (112, 114) by actively probing the environment to receive active measurements 126 to determine state information (e.g., network delay, or bandwidth of the cloud computing environment, time-to-start a computing instance that executes in the cloud computing environment, or the spot price for any of the cloud resources used to meet the SLA, or any combination thereof) for the cloud computing environment (112, 114). The CSMS 102 determines when the state information indicates that the SLA requirement is at risk (128) of noncompliance, and in response, the CSMS 102 dynamically adjusts (130) the SLA rule 120 to increase expectation of compliance of the SLA requirement. The CSMS 102 actively probes the shared environment (112, 114) to collect real-time (active 126) measurements regarding service quality and service response, so that the user may model the performance of service quality 132 and service response 134 and state of the shared computing environment (e.g., determine the state of the service quality 136 and service response 138). The CSMS 102 allows the user to understand the state of the cloud computing environment (136, 138), which is infrastructure that the user does not own, so that the user may make the best decision regarding the user's utilization of the environment's resources.

The CSMS 102 uses active probing to interrogate the environment with tests to determine the real-time state of the environment, and the state of the resources expected to be used to meet the users SLAs (e.g., the current state of the cloud environment). The CSMS 102 probes the environment (e.g., to determine the state of the cloud) to determine whether the environment can satisfy the user's desired computing resource requests (e.g., SLAs 122). The probe 140 acts as a feedback mechanism for the user to realize the actual state of the environment, beyond the information passive measurements 124 provided to the user by the service provider (112, 114). For example, in the telecommunications industry, when a user dials a phone number the telecommunications network service provider may return a busy signal to the user, rather than allowing the phone call to go through when the service provider knows that the call will be of poor quality. The user may prefer to get a busy signal rather than have the call go through and the call quality the poor. Accordingly, the CSMS 102 uses probes 140 to determine the state of the environment to facilitate user adjustments and preferences (e.g., using dynamic rules) to deliver services to the user. The CSMS 102 provides a system and method, using different types of measurements collected in various ways, to determine what data to store (146) and how frequently to store the data (and/or process the data), and based on analysis performed by the CSMS 102, the CSMS 102 determines the real-time state of the environment, adjusts the user's utilization and/or provides the user selectable options in order to achieve the user's SLAs. The CSMS 102 may change a user's SLA rule 120 (e.g., a static rule) to have a different time-to-request (126) a selected cloud resource among the cloud resources, a different time-to-start for a computing instance that executes in the cloud computing environment, a different number of computing instances to start or stop, and/or to direct a portion of cloud computing workload for the consumer to a different cloud computing environment, based on the real-time state of the environment. The CSMS 102 provides a visualization 152, using a user interface 148, of the state of the environment, including the service quality and service response.

Figure 2:
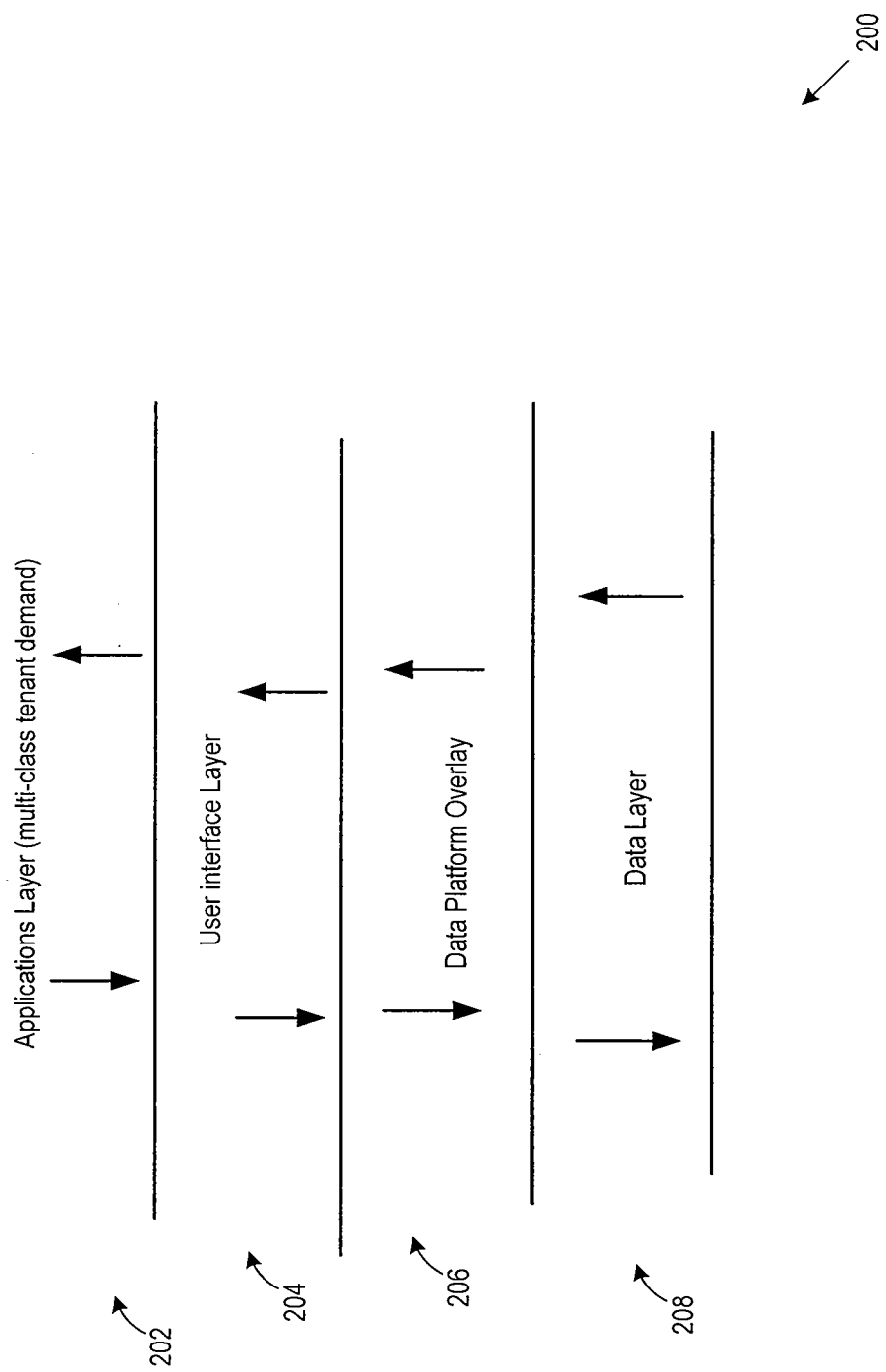
FIG. 2 shows a shared resource environment of multi-class, multi-tenant demands, and a data platform overlay.

FIG. 2 shows a shared resource environment 200 of multi-class, multi-tenant demands 202 (e.g., applications), and a data platform overlay decomposed into a user interface layer 204, and a data platform layer 206, and a data layer 208. For example, the challenges of one user (e.g., Satisfaction Airline's) may impose on the environment's ability to satisfy multi-class multi-tenant demand that is not known a priori. The CSMS 102 provides an overlay to capture and deliver data with the user's SLAs 122 for commodity compute, network, and storage resources. The CSMS 102 may be extended to dedicated resources (e.g., private data center and dedicated network).

Using for example, Amazon Web Services cloud as a service provider, the state of the service that the user is being provided varies over time, because there are other users sharing the resources in the cloud environment, and there are other operations occurring to which the service provider does not give the user visibility. In traditional infrastructure environments, where the resources were located in the users controlled area (e.g., a data center), and where the user had direct visibility to the resources that the user employee to deliver the users SLAs, although variations would occur over time in the user controlled environment, the user had direct visibility into all the resources being used in the environment and could make more informed decisions regarding adjustment to make in the environment. In the traditional data center direct visibility would allow a user to identify that the user's virtual machine is sharing a CPU with another user's virtual machine, where the other user's utilization is impacting the user, and moving the user to another CPU.

In a shared environment, where the entity providing computing resource services and the entity consuming computing resource services are separate and distinct, the service provider merely provides the user with measurements directed to the state of the user's resources, and provides no information regarding other shared resources used by other users that impact the delivery of service to the user. The service provider merely provides user specific resource measurements (e.g., passive monitoring or listening provides passive measurements—the user's CPU usage, the user's memory usage) to the user. The CSMS 102 actively probes the state of the environment and the resources in real time to directly know the state of the underlying resources in a shared environment (e.g., how the shared resources are being allocated to other users) and how those resources may impact the user's SLAs so that the user may adjust the user's actions (e.g., using dynamic rules). The CSMS 102 provides active probing, discussed in detail below, (e.g., injecting into the environment controlled traffic such as a file transfer, and/or resource usage such as turning on a computing instance or session) and collect real-time measurements directed to characterize the service quality and service response of the resources and the environment. Actively interrogating the environment, the CSMS 102 is able to discover the state of the environment and the state of the resources expected to be used to meet the user's SLAs so that the user may make more informed decisions (e.g., dynamically adjusting the user's resource utilization strategy in real time using dynamic rules).

The CSMS 102 characterizes service quality 136 and services response 138 by analyzing active measurements 126 including the time-to-start an instance and/or session, the time-to-transfer a file, CPU utilization demand and capacity, network bandwidth availability, network latency, and disk I/O access speed (reads/writes). The CSMS 102 determines whether the current state of the service possibly affected by a number of people accessing the environment impact the user's experience, including the service quality and service response.

The CSMS 102 may measure latency by sending a network packet to a destination and measures when the packet is received. In the same way, the CSMS 102 actively probes the environment to determine accurate real-time measurements affecting the quality of service 136 for the user. The CSMS 102 may analyze a service (e.g., shared resource) as a black box that needs to perform some processing in response to CSMS 102 active probe requests (e.g., packet, a request or job, to be completed by the black box service to measure the real-time service quality and/or service response). The CSMS 102 may use the time-to-start an instance or session, the time-to-transfer a file to characterize the service response, and use the network bandwidth availability and network latency to characterize the quality of service, including measuring the "maximum number of transactions" and read/write latency. The latency may be expected to grow when the underlying utilization is large.

Table 1 shows types of demands 154 and the user's SLA requirements. The CSMS 102 provides a way to identify appropriate passive and active measurements to collect in order to analyze the historical, real-time and long-term behavior characteristics of the computing environment, and use dynamic rules to meet the user's SLAs.

TABLE 1

Types and Levels of Access to Satisfaction Customer Data

| Application | Type | Latency | Scalability | Availability | Deadline | Cost |
|---|---|---|---|---|---|---|
| Sun Alliance Ticketing | Read/write Transaction | Upstream Latency within [30, 50 ms] w.p. 99.999% Downstream Latency within [40, 100 ms] w.p. 99.999% | Blocking Probability <0.001% | 99.999% a month | 8 AM PST Mon w.p. 99.999% | Max $1 per transaction |
| One Planet Ticketing | Read/write Transaction | Upstream Latency within [50, 100 ms] w.p. 99.999% Downstream Latency within [50, 200 ms] w.p. 99.999% | Blocking Probability <0.001% | 99.999% a month | On-going | Max $1 per transaction |
| Pricing Analytics | Read-only Batch Monthly | N/A | N/A | 99.9% $1^{st}$ of the month | 1 PM, $1^{st}$ day per month | Max $50 per transfer |

TABLE 1-continued

Types and Levels of Access to Satisfaction Customer Data

| Application | Type | Latency | Scalability | Availability | Deadline | Cost |
|---|---|---|---|---|---|---|
| Customer Rewards | Read-only Session | Downstream Latency within [20, 200 ms] w.p. 99.999% | Max sessions 5,000 | 99.9% a month | On-going | Max $50/hr |
| ERP | Read/write Session | Upstream Latency within [30, 50 ms] w.p. 99.999% Downstream Latency within [40, 100 ms] w.p. 99.999% | Blocking Probability <0.01% | 99.99% a month | On-going | Max $100/hr |

The types of demand parameters to collect measurements for may include types of transactions, latency constraints, scalability, throughput, capacity, availability, deadlines, security, compliance with a particular standard, consistency/freshness of the data, and costs (per hour, per transaction). For example, the blocking probability to determine when demand exceeds capacity, such that the blocking probability in the phone network is the probability that a caller gets a busy signal when attempting to make a phone call. The types of demand parameters may also include throughput, the number of transactions per second, the number of simultaneous sessions, the time to process a job, the megabits per second, the carbon production per metric tons of carbon used, measurements around performance for example the CPU of the instance assigned to the user needs a certain threshold or tolerance in order to meet the users SLA. The CSMS 102 uses the demand parameters to characterize the service quality and service response. The types of demand parameters identify the measurements to collect that characterize the service quality and service response of the shared computing environment. The CSMS 102 identifies the state of the environment, including the state of the shared resources, available utilization and resources, and identifies the measurements to accurately characterize service quality and service response.

Figure 3:
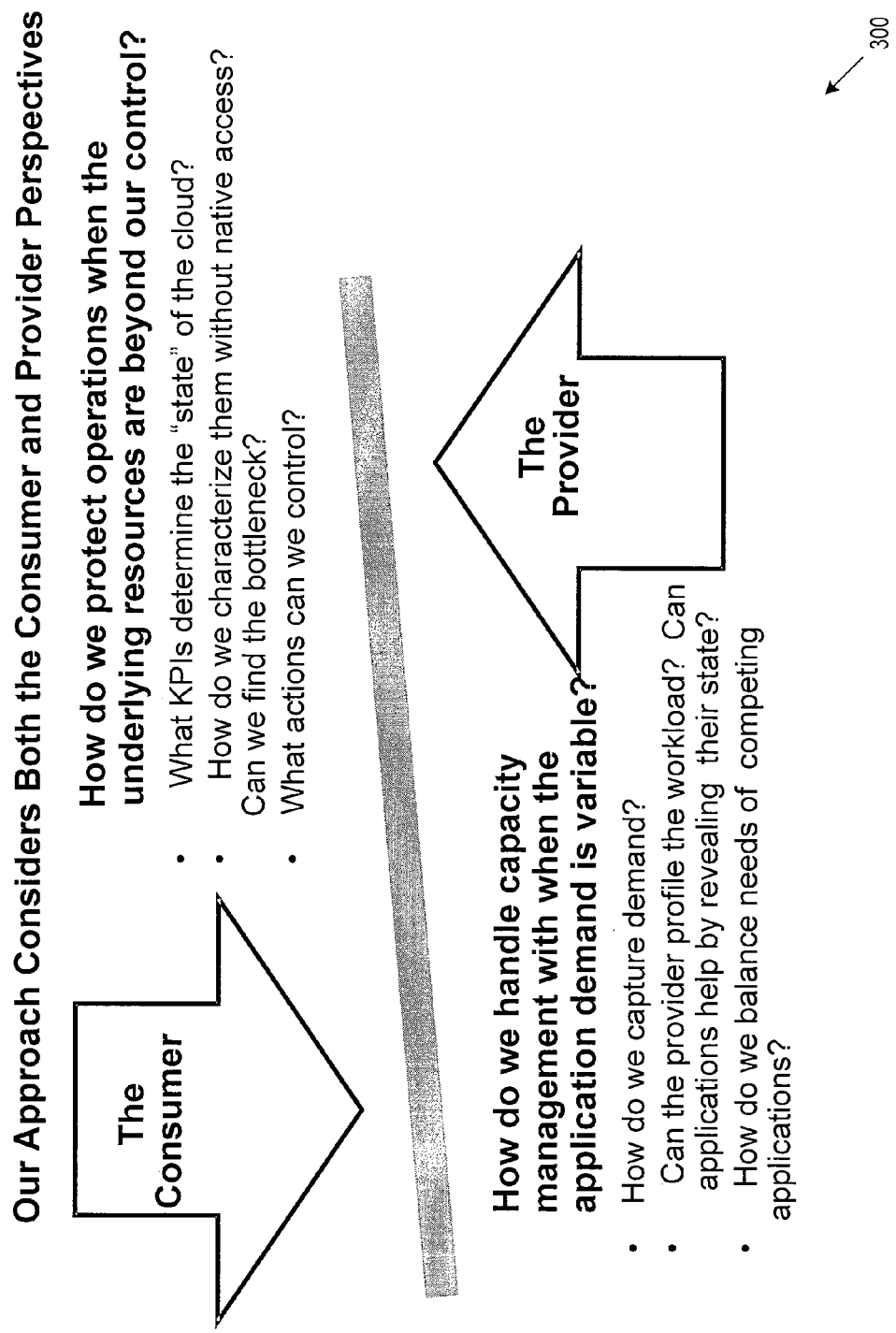
FIG. 3 shows some of the issues to balance in the interests of the service provider and the user.

FIG. 3 shows some of the issues to balance in the interests of the service provider and the user 300. The CSMS 102 actively probes the environment for measurements of KPIs that characterize the state of cloud-based services, used to determine an accurate adjustment to operations make to meet the user's SLAs. The CSMS 102 analyzes the user's (service consumer) and service provider's perspectives. The CSMS 102 provides a way to protect operations when the underlying resources are beyond the user's control. The CSMS 102 determines what KPIs determine the "state" of the cloud and collects the appropriate measurements accordingly. The CSMS 102 provides the user the ability to characterize the state of the environment without native access to the environment. The CSMS 102 identifies computing bottlenecks and dynamically adjusts the user's resource utilization actions. The CSMS 102 identifies what actions to control using dynamic rules to make real-time adjustments. The CSMS 102 develops and applies models that accurately reflect the behavior of the environment to handle capacity management when the application demand is variable. The CSMS 102 may use normal random variables (Gaussian random variables) to model the service capacity of the environment. Given the speed at which, and/or the frequency at which certain events occur in the environment (e.g., capacity availability changes, and/or demand changes), the CSMS 102 may use linear regression and/or a Poisson process model to determine the state characteristics of the service capacity of the environment. The time to start and/or latency may change less frequently in the environment, and the CSMS 102 may use the sample mean and the sample variance to determine state characteristics of the service response of the environment. The provider may profile the workload to assist the user to adjust the user's actions, and applications may reveal their states in order to assist profiling the workload of the environment. The CSMS 102 provides a way for user's and service providers to balance respective needs of competing applications.

The cloud consumer monitors the state of the cloud and chooses what, when, and how much to use of the resources. The user (consumer) factors in the state of the cloud in two ways: 1) the time needed to procure and setup a service; and 2) native visibility to underlying service experience (e.g., network utilization, or VM CPU performance). The CSMS 102 actively probes the environment and measures change to cloud state, adjusts service consumption (e.g., what should be use and when), and characterizes long-term impact of both measurements and adjustment policies. While traditional control layers provide static mappings to infrastructure, static rules, in a transparent view of resources (e.g., user controlled data center), the CSMS 102 provides dynamic mapping to infrastructure, although the user has an opaque view to service provider resources.

In order to satisfy the user's SLA, the user uses the CSMS 102 to dynamically adjust the resource utilization strategy to achieve the user's SLAs. In the past, the person who designed and developed an application was a different person than the person who maintained the application in production. In such cases, when the application shutdown and the application needed to be restored, the person restoring the application was a different person than the person who designed the application. However, in today's agile hyper-parallelized shared computing environments, where applications are expected to fail from time to time as the norm, and where one or more application replica are also distributed across the environment for fail over and recovery, applications today are designed from inception with requirements that satisfy the designer and the operational environment regarding recovery actions. Accordingly, applications may be designed for shared computing environments by incorporating into the design operational recovery logic that triggers a dynamically configurable action when the application fails (which may also be dynamically characterized) based on real-time state information. For such applications, the designer may provide interfaces and adaptive logic that uses dynamic rules to trigger when and what actions to perform, based on the accurate characterization of the state of the environment, and the characterization of the long-term capacity of the resources provided to the application to achieve the application's SLAs. The design for applications intended for a shared computing environment becomes tightly coupled to the operational requirements of the application, including the environment where the application is executed, because failures and degradation are expected to be the norm in such computing environments and because you're using other people's resources or you're using resources that you cannot control.

The CSMS 102 allows the user to actively probe the state of the environment, beyond the user's own computing resources, so that the user is able to change their behavior in response to the state of the environment. The CSMS 102 provides more information than measurements of the user's assigned resources as provided by the service provider's passive instrumentation. The CSMS 102 and method provide a way to identify the optimal time to request and perform particular computing operations, based on actively probing the computing environment (e.g., requesting an instance or session or transferring a file, and measuring the service quality and the service response). For example in the case of a phone call, the user may have the option to set a preference for the level of call quality preferred by the user for a particular call, caller, or particular type of phone call (e.g., the service will provide for an emergency phone call regardless of the quality of the call service, because based on a configurable rule, an emergency phone call must go through). In another example, a utility company may offer a consumer the option to schedule the use of appliances to receive rebates or use electricity at a lower rate, based on actively probing the electric capacity available to all consumers of the electricity provided by the utility company. Similarly, the CSMS 102 provides the user a way to dynamically adjust resource utilization in a shared computing environment based on service quality and service response of the environment. The CSMS 102 and method allow the user to accurately identify the service quality and service response the user may expect to receive from the environment, and provides dynamic adjusts to resource utilization in order to meet the user's SLAs.

The service provider and user may use the CSMS 102 to optimize the service providers delivery strategy and exchanges measurements with the user, and assist the service provider and the user to adjust respective activities to meet respective SLAs. For example, the service provider may provide certain performance metrics to the user in order to inform the user, and thereby, affect the user's behavior. For example, the service provider may use the CSMS 102 to provide users with active measurements to identify when resource utilization is the most cost-effective at particular times of the day, and control agents to dynamically adjust user resource utilization throughout the environment.

The CSMS 102 provides real-time instrumentation that determines the real-time state of the cloud and historical state of the cloud. For example, the computing environment on Monday morning at 6 AM may be really busy (e.g., historical information). The time-to-start an instance may include a maximum, minimum, and/or average observed value. The CSMS 102 provides the user a way to use the real-time instrumentation, real-time state of the cloud and historical state of the cloud to dynamically adjust the users planned utilization of the computing resources provided by the environment. Accordingly, the user can control their behavior and adjust resource usage efficiently and effectively (e.g., providing the user a smart meter option in a shared services environment). In this way the user decides when to initiate execution of tasks using the environment's resources, for example determining when to migrate an application, or determine when to scale an application on an increased number of nodes (e.g., instead of using one virtual machine, the user employs two or any number of virtual machines).

The CSMS 102 provides a recipe for planning a user's resource utilization in a cloud computing environment. The CSMS 102's instrumentation, collection of measurements, and the dynamic adjustment work together to provide the user a way to build dynamic rules to plan resource utilization in a shared resources environment, and determine what options are available to the user to select in order to carry out the dynamic rule. The CSMS 102 provides configurable system agents that the user may use to automatically carry out one or more of the resource utilization options identified by the CSMS 102 and/or selected by the user.

For example, when the user wants to ensure that an application is available at 8 AM on Monday morning, the CSMS 102 determines, the active probing, collection of measurements, and the dynamic adjustment work together to initiate resource requests in advanced of 8 AM on Monday in order to ensure that the application is available at 8 AM. For example, the CSMS 102 may adjust the start of the boot cycle for the application and nodes supporting the application to 50 minutes ahead of the desired time for user application availability based on the state of the environment (e.g., to account for the time to start the instances associated with the environment, transfer the data, configure the settings). The CSMS 102 and/or the user formulates a dynamic rule that dynamically adjusts to perform actions that the user wants to take based on historical measurements (e.g., historical state of the environment) and the real-time dynamic measurements (e.g., real-time state of the environment discovered through probing).

In addition to the CSMS 102 providing active probing, collection of real-time measurements, and dynamic rules, the CSMS 102 identifies where to perform the monitoring and leverages existing monitoring solutions (e.g., VMware, Amazon cloud watching natively) to collect the metrics, and provides an interface to one or more infrastructure management orchestration tools to implement the dynamic rules developed by the CSMS 102. The CSMS 102 locates where the monitoring and data collection most optimally should occur, how frequently to collect the data and how persistent to make the data collected, where the dynamic rules will be located and executed, and where the performance measurements will be communicated and stored. The CSMS 102 accommodates the user's restrictions and/or preferences regarding where certain data may reside (e.g., data as may be stored in a striped Redundant Array of Independent Disks (RAID) fashion across multiple service provider environments for security and/or efficiency reasons). The CSMS 102 monitoring agents may reside on each node where the user's application is deployed. The agents may wake up on some configurable frequency and probe the environment to determine the real-time state of the environment, and send the result of the probe to a configurable repository location. In another example, the user may implement a central reporting node that manages the tests to run by the monitoring agents, and the messages to/from the monitoring agents distributed throughout the entire set of agents.

The CSMS 102 uses a sampling calculation to determine the data collection measurements to store and/or persist (e.g., the sample mean and the sample variance). The CSMS 102 provides confidence intervals to choose to determine the amount of sampling to perform. Table 2 shows how the CSMS 102 may use confidence interval to choose the amount of sampling (collection of measurements) the CSMS 102 performs.

TABLE 2

Confidence Interval

∃ n samples $$P_r\left(|\bar{\mu}_n - \mu| \frac{\sqrt{n}}{\sigma_n} > \chi\right) \approx \text{table}$$

↖ actual mean

E.g.

$$P_r\left(\left|(\bar{\mu}_n - \mu)\frac{\sqrt{n}}{\sigma_n}\right| > 2\right) \approx 5\%$$

$$\Rightarrow P_r\left(\mu \in \left[\bar{\mu}_n - \frac{2\sigma_n}{\sqrt{n}}, \bar{\mu}_n + \frac{2\sigma_n}{\sqrt{n}}\right]\right) \approx 95\%$$

confidence interval with 95% confidence

| χ | $P_r(|N(0,1)| > \chi)$ |
|---|---|
| 1.00 | 31.7% |
| 1.64 | 10.0% |
| 1.96 | 5.0% |
| 2.00 | 4.55% |
| 2.58 | 1.0% |
| 7.13 | $10^{-12}$ |

Figure 4:
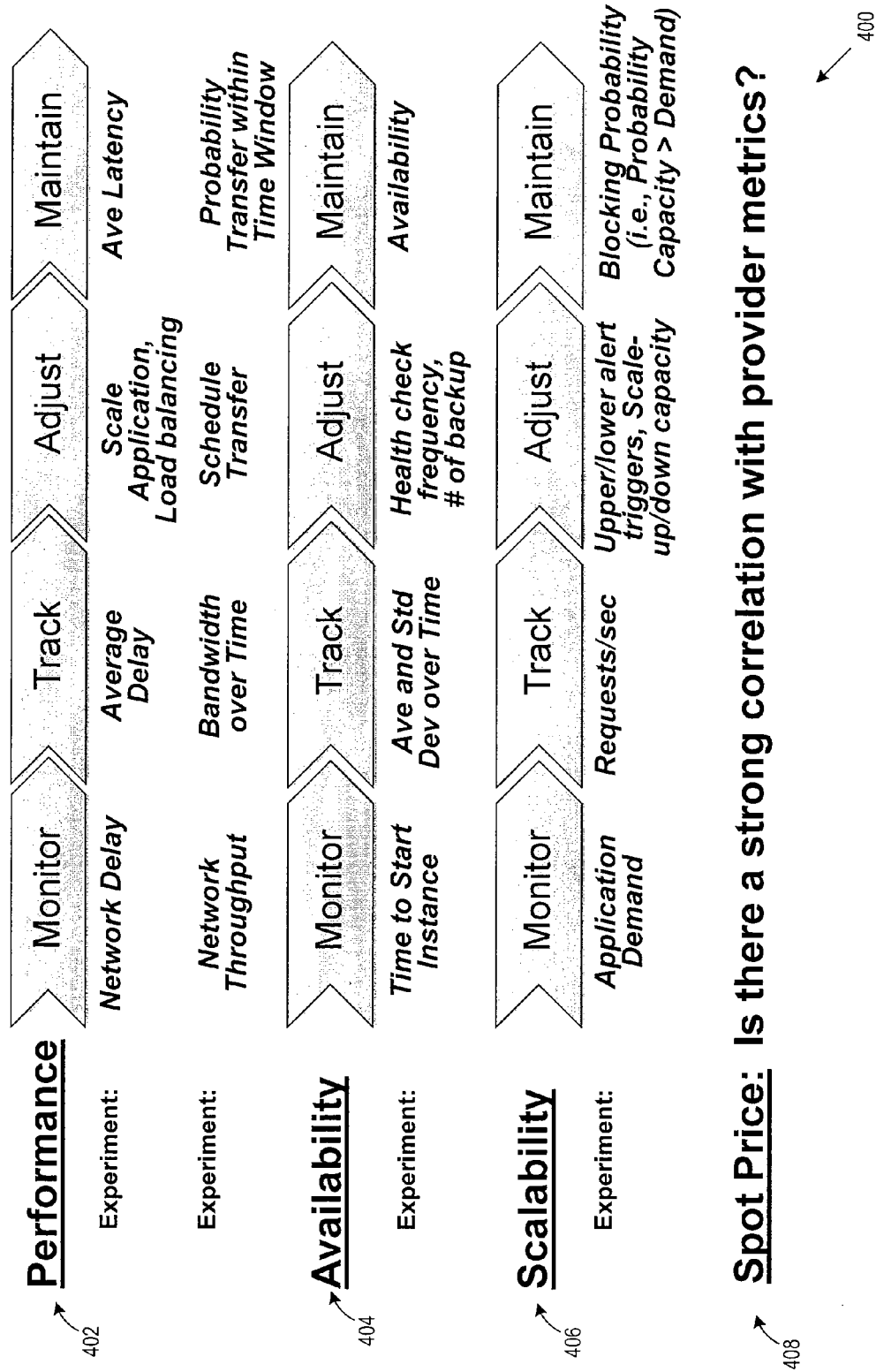
FIG. 4 shows types of active probing performed by the CSMS.

FIG. 4 shows types of active probing 400 performed by the CSMS 102. The CSMS 102 characterizes at least three types of measurements to determine the "state-of-the-cloud" service, including performance 402, availability 404, and scalability 406. The CSMS 102 actively collects measurements obtained by actively using the service, and the active measurements may be combined with existing use of service measurements (i.e., benchmarking, historical measurements). The CSMS 102 installs and/or injects agents that consume the services to obtain the active measurements. For example, the CSMS 102 installs and/or injects agents to start an instance, transmit traffic, or run a workload so that the CSMS 102 may measure the resulting resource utilization and realize the real-time state of the environment.

The CSMS 102 determines the state of the cloud, by using active probes 140 that test the computing environment to gather data about the environment that the service provider does not currently provide to the user. The CSMS 102 applies decision-making logic, and/or dynamic rules and adjusts the user's computing resource utilization behavior accordingly based on the state of the service quality and service response of the environment. The CSMS 102 identifies where to look in the environment to determine the state of the environment. Passive instruments (read-only) (e.g., Amazon™ Web Service's Cloud watch) expose CPU, Memory utilization, Network utilization, Bytes read/written to disk, and may provide the user the state of the users resources with no insight into the environment as a whole. Users with only passive measurements analyze historical information and make decisions based on the long run average observed. Passive instrumentation may provide the user with the user's node (virtual machine) CPU utilization, but may not provide the overall CPU utilization for the physical machine where the node with other nodes belonging to other users is executing. Active probing performed by the CSMS 102 provides the user performance information as the user may be impacted by consumption from other users using the same physical machine as the user's node. Active instrument (probing) (e.g., ping measures latency) provides a way to measure network latency, network goodput defined by the actual throughput, and time-to-start a compute instance. Active probing identifies strategies to plan resource utilization in a shared computing environment.

The CSMS 102 identifies what measures to collect in order to accurately characterize the real-time state of the environment, and how you characterize the state of the environment in response to the actions necessary for the environment to provide resources to meet the users SLAs. The CSMS 102 leverages the use of active probing measurements to accurately and efficiently characterize the state of the environment. The CSMS 102 interfaces to monitoring systems and orchestration systems to collect measurements and execute dynamic adjustments using dynamic rules and/or monitoring agents. The CSMS 102 further leverages the use of dynamic rules to modify static rules (traditional rules) that are merely based on historical and/or extreme-case (e.g., projected maximum demand) state information. Dynamic rules include triggering interfaces and actions that are dynamically adjusted based on the real-time measurements collected by the CSMS 102. Dynamic rules characterize the operational aspects regarding what action to take when a particular event occurs in the environment, and characterizes the long term behavior resulting from performing the action.

Service providers merely provide passive measurements the user obtains by reading existing instrumentation without perturbing the on-going activity. For example, passive measurements may be collected without perturbing workload read-off the background CPU utilization, network utilization, memory usage, a number of instances running at any time, or on-going costs. The CSMS 102 may implement four active measurements including: network delay—active; bandwidth (e.g., characterized in terms of megabits per second or mbps)—active; time to start—active; and the spot price 408—contractual. Measurements provided by a service provider (e.g., Amazon) may include CPU Utilization—Passive; Network Bytes Transmitted/Received—Passive; Memory Utilization—Passive; Bytes Read/Written—Passive; Number of instances—Passive.

The CSMS 102 may initiate a particular workload and collect the measurements, classified as active probing (e.g., the workload may be performing a "read-only" operation, and/or the workload may perform a series of computations, or access a data file). The CSMS 102 measures shared service provider's environment (e.g., Amazon Web Services Elastic Cloud Computing Services (AWS EC2)). AWS EC2 allows the user to start and terminate instances in the cloud. The CSMS 102 measures delay in the network, by controlling instances in the cloud that communicate with each other in some way. The CSMS 102 measures quality and speed of the communication the status of the cloud in terms of network. In order to determine the quality and speed of that communication The CSMS 102 may start instances in the cloud that ping each other, and terminate the instances once the measurements are collected.

The CSMS 102 measures bandwidth to determine the status of the cloud in terms of the network. Table 3 shows programs that may be used to measure the bandwidth of an environment.

TABLE 3 programs useable to measure the bandwidth iPerf
jPerf (GUI for iPerf)
NTttcp (Microsoft)
NetCPS
Chirp The CSMS 102 may use iPerf to estimate the bandwidth between two instances by sending bytes of data over time (e.g., some configurable interval), and send bytes of data over a TCP connection. The CSMS 102 measures time to start and spot price, wherein CSMS 102 instances do not communicate with each other when measuring time to start and spot price. The CSMS 102 may use a central node to start the CSMS 102 instances. The central node collects data after the CSMS 102 instances have started. The CSMS 102 computes the actual start time of instance as the difference between time of request and actual start time to obtain the starting time for the instance. The CSMS 102 determines the spot price of the instance with the results of the active probing.

The collection of the measurements may be performed using various monitoring and data collection strategies (e.g., decentralized local agents at the node perform monitoring and store real-time measurements locally and link-state algorithm to communicate the real-time measurements collected by each of the agents to all the agents in the environment, or a centralized coordination node that controls, collects and stores real-time measurements from a distribution of agents assigned to respective nodes). The CSMS 102 analyzes the data collected and determines one or more models to use to accurately determine the state of the resources and the state of environment. Determining the bounds to apply, and regression and/or probabilistic analysis to model the state of the environment.

The CSMS 102 collects and communicates the measurement data by coordinating when the measurements should be taken. The CSMS 102 executes active measurements when required, and/or as scheduled. The CSMS 102 collects the results of the active measurements, and read the results of passive and/or contractual measures. The CSMS 102 transfers the measures to subscribing agents that may include the long term repository, optimization engine, and/or a rules engine. The CSMS 102 retains and persist the measurements over time. The CSMS 102 may perform these actions in a number of configurations including the combination of coordination node(s), test node(s), and measurement repository.

In shared systems (e.g., cloud environments), the "state" in terms of the quality or availability of the services as observed by the consumer varies by the use of the other consumers and the provider policies. The CSMS 102 captures this "state" that varies over time. The CSMS 102 may focus on network and compute "clusters" (where a virtual machine may be provisioned), and refer to multi-tenant applications, and storage systems. Some methods measure the state of the cloud by directly observing the load generated by all the users of the shared resource, and indeed this approach may be taken by the cloud provider. The CSMS 102 differs in that the cloud consumer observes the current and historical service the user experiences.

The CSMS 102 stores the collection of measurements in a structured data model 150 for a highly parallelized processing environment (cloud computing) so that CSMS 102 manages the load and leverages the distributed nature of the environment for the performance of the CSMS 102. The CSMS 102 may use a non-relational database (e.g., Cassandra NoSQL) that scales to a large amount of data, provides discrete data metrics, log and trace files, and provides massive parallel read and write access. The CSMS 102 models the data, determines how to structure the data in the data model efficiently in order to manage massive parallel read and write access (e.g., thousands of CSMS 102 agents actively probing nodes in the environment) used to accurately determine the real-time state of the environment. The CSMS 102 identifies how often to sample, and identifies what to persist (e.g., raw traces, or average).

The CSMS 102 may use a centralized node for management and collection of measurements. The CSMS 102 in a highly parallelized distributed processing environment may be configured so that individual nodes collect information locally and/or store the data locally and distribute the data when requested (e.g., link-state protocol).

The CSMS 102 provides dynamic rules about how to modify other rules (static rules). The CSMS 102 uses the measurements, including the traditional rules/static rules that identify the resources to scale up or down (e.g., using VMware the user may set a rule that triggers an action when resource capacity availability reaches 80% so that the user may trigger a migration of the application to another machine or the start-up of multiple nodes to offset some of the computing load). The triggering action may be considered static, however, modifying the rule to adjust when to trigger the action and where to migrate an application to meet the user's SLAs the rule may be considered dynamic. The CSMS 102 allows the user to dynamically adjust real-time behavior based on real-time measurements, and the CSMS 102 characterizes the long-term behavior of the adjustment in order to accurately determine the result of the decision to make the adjustment. The CSMS 102 provides a way to identify actions and how to adjust the actions based on real-time measurements, and identify how to characterize the combination of operations and historical measurements.

The CSMS 102 may probe the environment for delay, bandwidth (BW)-flood, and bw-chirp. For example, the CSMS 102 uses a central node to start the instances, the instances communicate with each other and measure delay, BW-flood, BW-chirp. The CSMS 102 may use alternate approaches to actively probe for delay, BW-flood, BW-chirp, including: 1) each of the active probe 140 instances report back measurements to central node; and 2) the active probe 140 instances write measurements directly into the database (e.g., Cassandra Node or other NoSQL database).

Table 4 shows central node functions the CSMS 102 may use.

TABLE 4 delay, BW-flood, BW-chirp Central Node Functions start_instance (String imageId, String instanceType,
String availabilityZone)
run_delay( )
run_bandwidthFull( )
run_bandwidthChirp( )
read_delayData( )
write_delayData( )
read_bandwidthFullData( )
write_bandwidth Full Data( )
read_bandwidthChirpData( )
write_bandwidthChirpData( )
data_analyze( )

Table 5 shows time to Start and Spot Price Central Node Functions used by the CSMS 102. The CSMS 102 uses a central node o starts the active probes 140 instances to send requests and collect the measured actual start time (e.g., characterize the service response of the environment).

TABLE 5

Time to Start and Spot Price analysis
Central Node Functions start_instance (String imageId, String instanceType,
String availabilityZone)
read_timeToStart( )
// collect both time of request and actual start time
write_timeToStart( )
read_spotPrice( )
write_spotPrice( )

Figure 5:
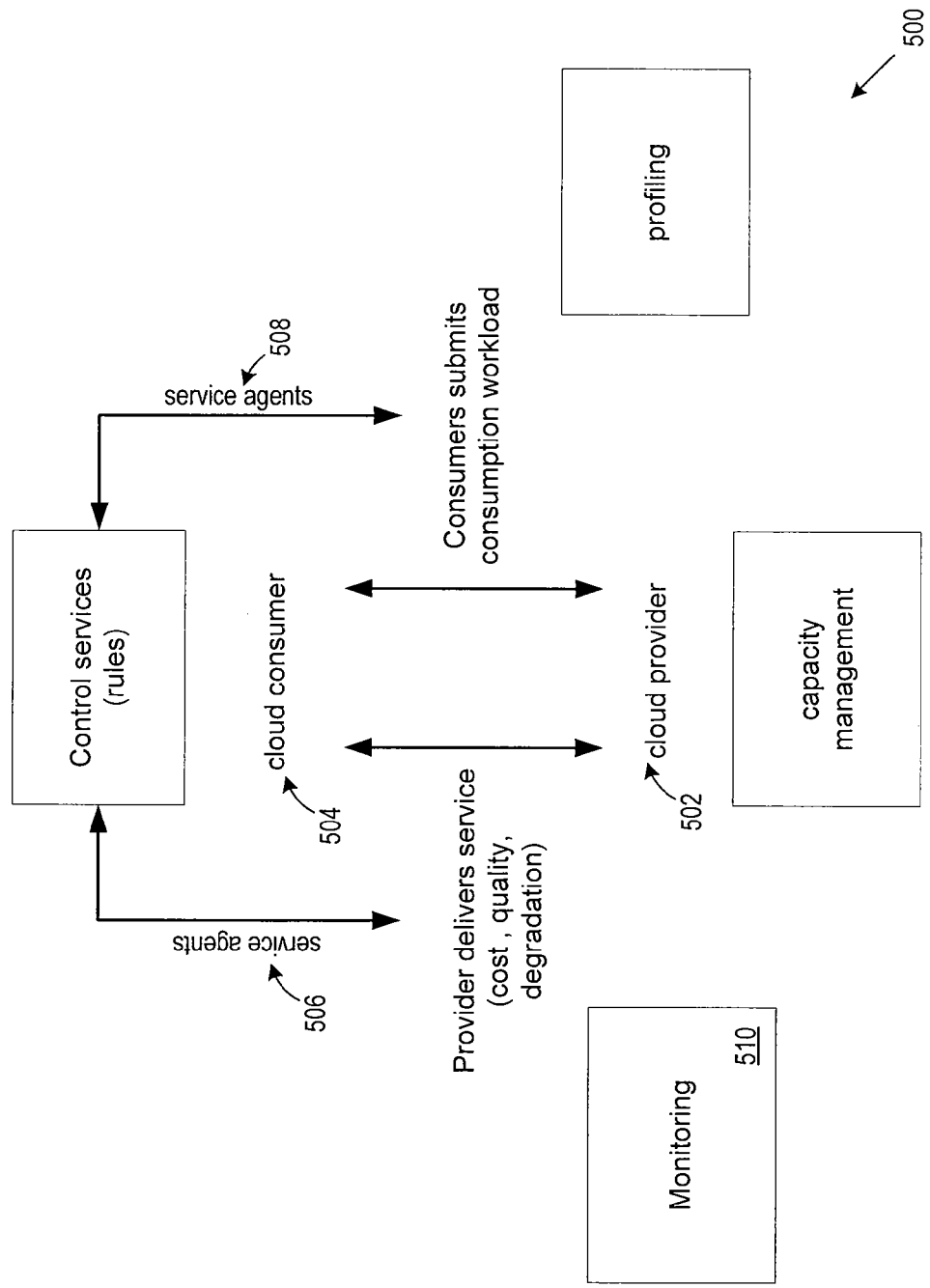
FIG. 5 shows a cloud provider and consumer framework provided by the CSMS.

FIG. 5 shows a cloud provider 502 and consumer 504 framework 500 provided by the CSMS 102, where the cloud provider 502 and consumer 504 work together to coordinate resource utilization. In addition to providing the user 504 with a user interface to control the dynamic rules, the CSMS 102 uses the service agents (active probes 506, 508) and interfaces to rules engines, capacity planning tool, an orchestration tool, predictive operations, and a traditional control layer tool, or any combination of these systems and/or other systems to implement the dynamic rules. The cloud consumer 504 provides SLA requirements 122, and provides application workload 156. The CSMS 102 monitoring platform 510 detects and characterizes "how" services are provided, collects observations, estimates the state of the cloud, and dynamically adjust rules. The CSMS 102 may include an SLA controller 158 in communication with a database to adjust the SLA rule to increase expectation of compliance of the SLA requirement, when the CSMS 102 determines that the SLA requirement is at risk of noncompliance. The CSMS 102 interfaces with automation/orchestration tools to implement adjustments. The CSMS 102 may leverage rules engines, orchestration engines, capacity planning tools, and predictive operations to provide accurate adjustments to meet the user's SLAs.

Figure 6:
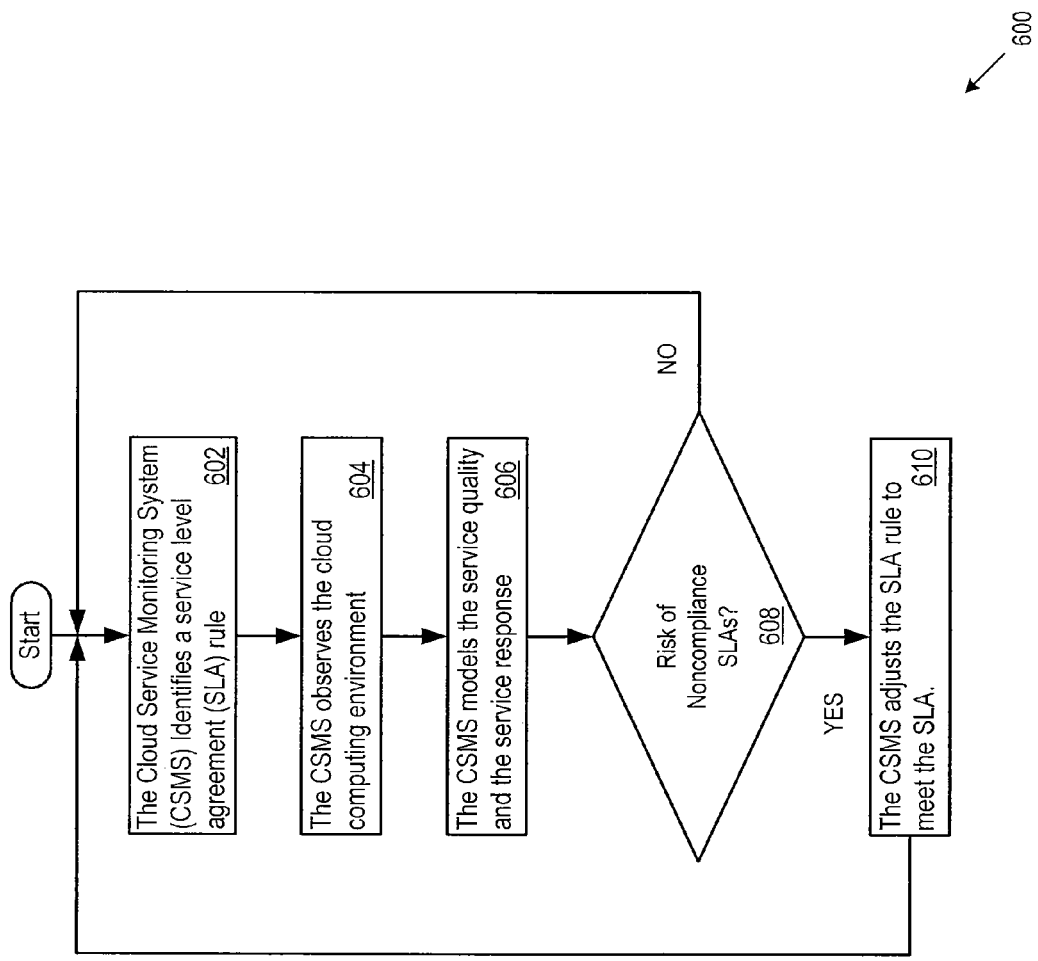
FIG. 6 shows the flow diagram of the logic the CSMS may use to determine an adjustment of an SLA rule.

FIG. 6 shows the flow diagram 600 of the logic the CSMS 102 may use to determine an adjustment 130. The CSMS 102 identifies a service level agreement (SLA) rule configured to execute in order to meet a SLA requirement for a consumer of a shared service (602), where services providers provide cloud computing environments and shared services. The CSMS 102 observes the cloud computing environment to determine state information for the cloud computing environment (604). The CSMS 102 identifies where to perform the monitoring (observations) and leverages existing network monitoring solutions (e.g., VMware, Amazon cloud watch natively) to collect the measurements. The CSMS 102 obtains passive state information provided by the cloud computing environment, and obtains detected state information by probing the cloud computing environment. The CSMS 102 may obtain active measurements for network delay/latency, or bandwidth of the cloud computing environment, the time-to-start a computing instance that executes in the cloud computing environment, the spot price for any of the cloud resources used to meet the user's SLAs, or any combination. The CSMS 102 distributes monitoring agents (e.g., CSMS 102 instances) to nodes to actively probe the environment and collect real-time measurements in response to the active probing.

The CSMS 102 determines one or more models to apply to the collected measurements to characterize the service quality and service response of the environment (606). The CSMS 102 may use different models to apply to the collected measurements to characterize the service quality, and service response of the environment based on the underlying behavior of the collected measurements observed. Given the speed at which, and/or the frequency at which certain events occur in the environment (e.g., capacity availability changes, and/or demand changes) the CSMS 102 may use linear regression to determine the state characteristics of the service capacity of the environment. The time to start and/or latency may change less frequently in the environment, and the CSMS 102 may use the sample mean and the sample variance to determine state characteristics of the service response of the environment.

When the CSMS 102 determines the state information indicates that the SLA requirement is at risk of noncompliance, the CSMS 102 adjusts the SLA rule to increase expectation of compliance of the SLA requirement (608, 610). The CSMS 102 may change the SLA rule to have a different time-to-request a selected cloud resource among the cloud resources (e.g., the request may be initiated earlier or later depending on the state of the environment). The CSMS 102 may change the SLA rule to have a different time-to-start for a computing instance that executes in the cloud computing environment. The CSMS 102 may change the SLA rule to direct a portion of cloud computing workload for the consumer to a different cloud computing environment (e.g., using multiple service providers to deliver the user's SLAs). The CSMS 102 implements the SLA rule change using an interface to one or more infrastructure management orchestration tools.

Figure 7:
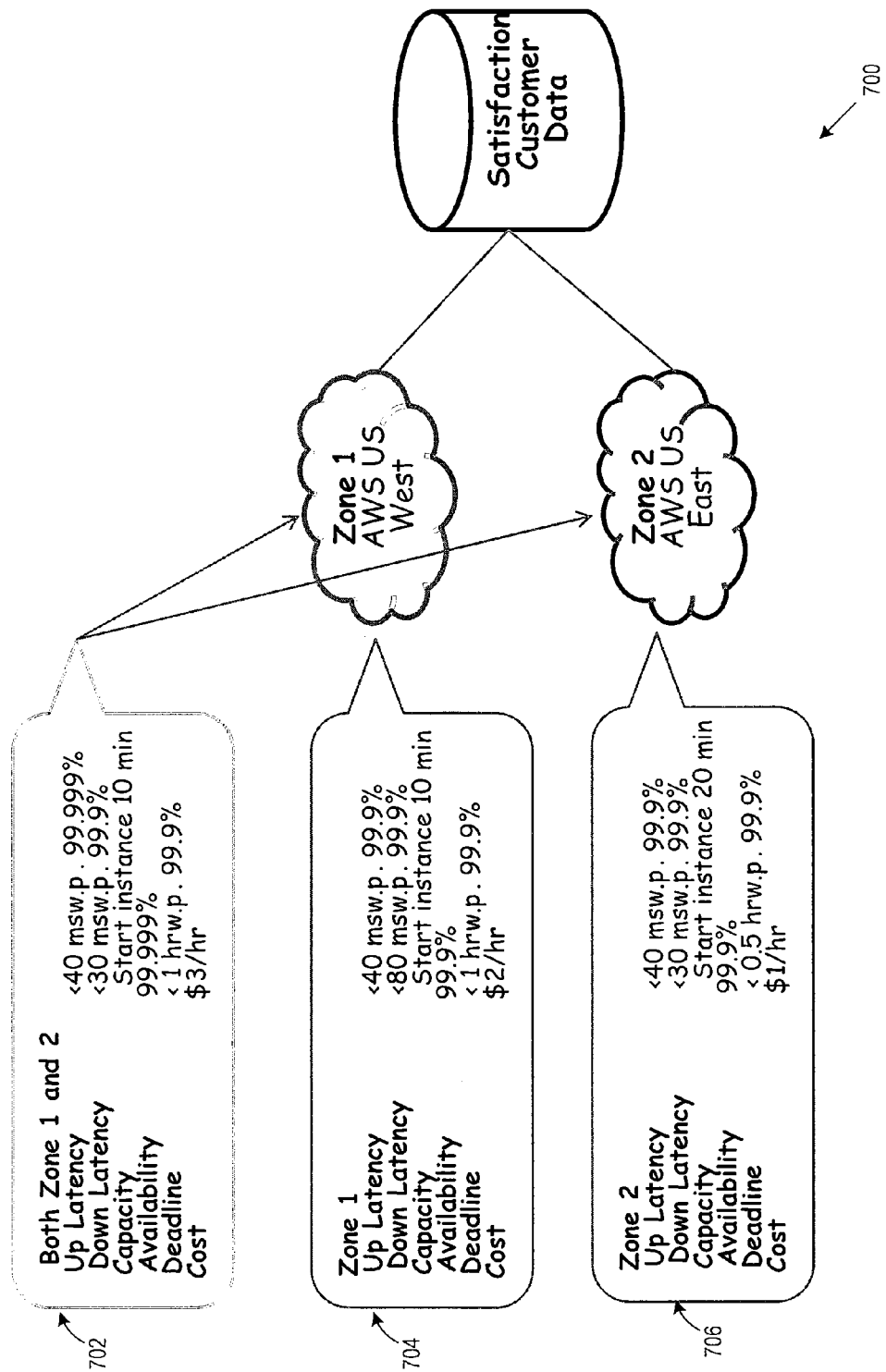
FIG. 7 shows long-term sourcing decisions based on historical performance.

FIG. 7 shows long-term sourcing decisions 700 based on historical performance, and an application's SLA preferences 702, the achievable SLAs per location displayed by the platform 704, and the published SLAs based on dynamically adjusted actions 706. For example, based on the decision to use zone 1 and zone 2, and the measured statistics and historical state information about zone 1 and zone 2, the expected performance based on the long-term decision to use zone 1 and zone 2 in combination is dependent on the characteristics of zone 1 and zone 2 and how zone 1 and zone 2 carryout the composite servicing. The published SLA's based on the dynamically adjusted actions. FIG. 7 shows the SLA metrics the resources of the environment may be expected to achieve, given each resource's behavior and how the user intends to use the resources (e.g., zone 1 and zone 2).

Figure 8:
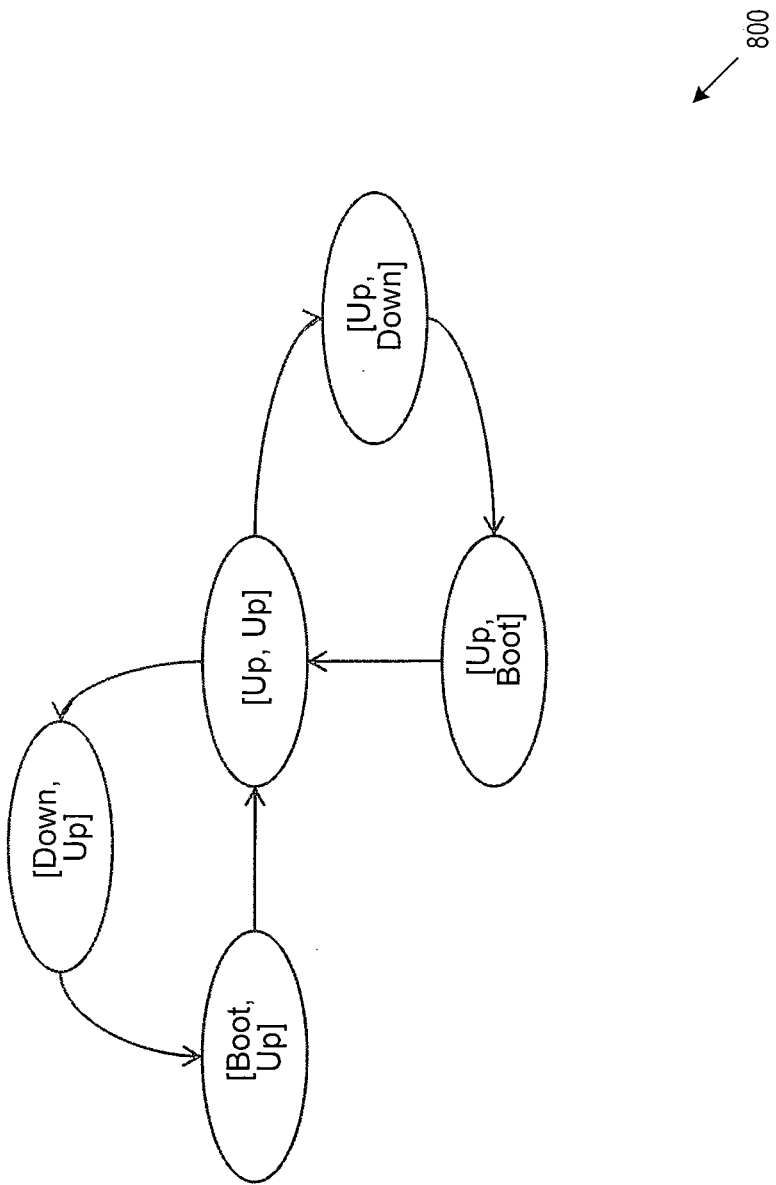
FIG. 8 shows composite service rule scenarios.

FIG. 8 shows composite service rule scenarios 800 for multiple computing zones. FIG. 8 shows the analysis considerations CSMS 102 may analyze including the time to boot an instance and make available the user's application for use (e.g., up and ready for use) when multiple zones are available to meet the user's SLAs.

Figure 9:
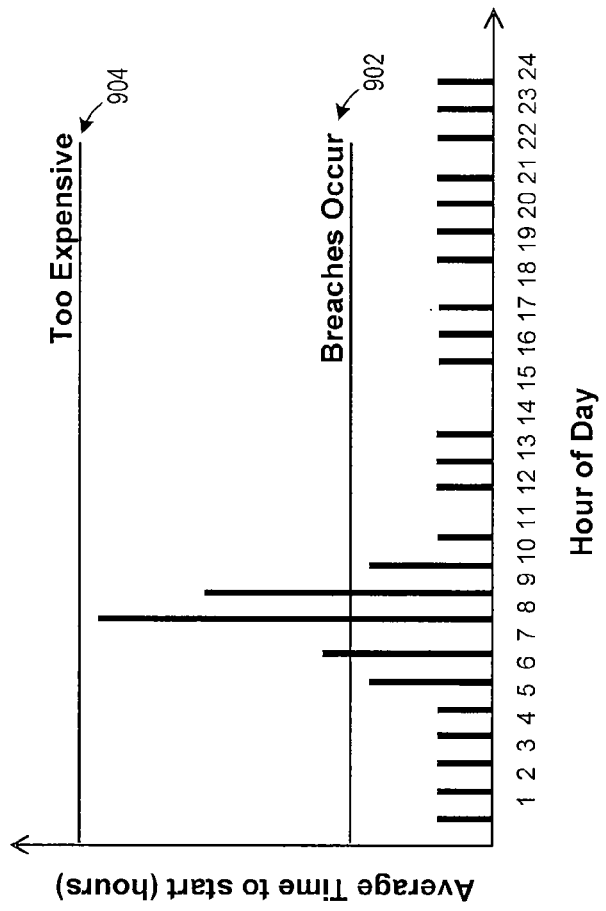
FIG. 9 shows time-to-start decision factors.

FIG. 9 shows time-to-start decision factors 900, including average time when a breach occurs 902 and the times of the day when time to start is too expensive 904. Traditionally where the user had access to a fixed infrastructure and assigned to 10 nodes, and the users application maps to the same 10 nodes, so that even though a rule may be a dynamic rule that triggers when a event occurs the rule that triggers the turning on of additional nodes from the same set of 10 nodes. The user could expect a particular performance from each node. However, in a shared computing environment, the user may not know where the user's application is located in the computing environment, and the user may not know the actual performance of the nodes (short-term and long-term) assigned to the user's application. The CSMS 102 provides a way for the user to probe the environment, and combine historical state information with dynamic state information about the computing environment in order to dynamically carry out action in the computing environment that allow the user's application to meet the user's SLA.

Historically users had a fixed performance threshold and infrastructure, and scaling was performed using known resources and static rules. However, the CSMS 102 provides a way to dynamically change when an action is trigger (e.g., rather than always triggering when capacity reaches a fixed threshold like 80%) based on both historical state information and the real-time state information collected and analyzed by the CSMS 102. Accordingly, dynamic rules may trigger scaling to more nodes when capacity reaches 20% or 40%, rather than the static rule 80%, because the CSMS 102 characterizes the environment resources in real time so that the user may know the expected capacity of the resources the service provider provides to the user.

Figure 10:
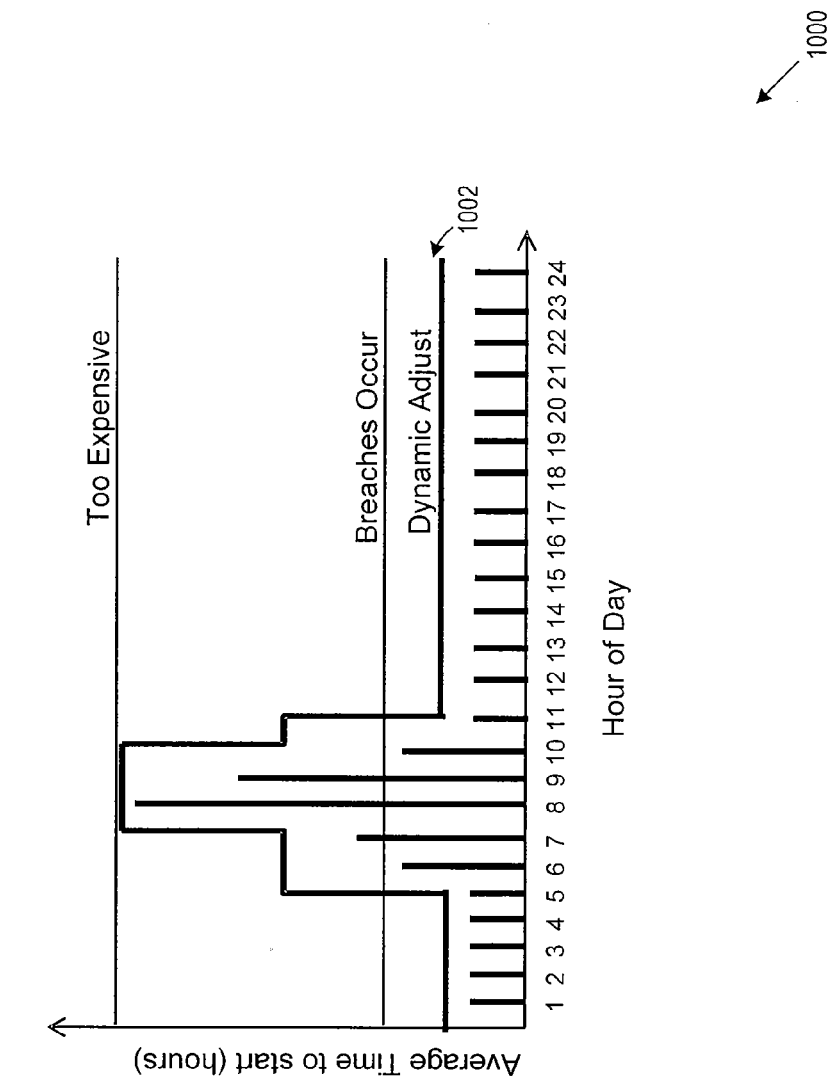
FIG. 10 shows a dynamic adjustment to the time-to-start.

As shown FIG. 10, the CSMS 102 may trigger scaling to multiple zones using a dynamic adjustment 1002 made to the time-to-start. The CSMS 102 provides dynamic rules that account for the real-time state of the resources and the computing environment, so that the CSMS 102 triggers actions at different times and places than otherwise set by the traditional static rule (e.g., triggering when capacity reaches 80% and scaling to dynamically determined locations or zones). The static portion of a rule, for example, scaling up resource capacity when current capacity reaches a static threshold, dynamic rules include metadata used to determine when to scale based on the real-time state of the environment and in particular the real-time state of the resources the user may expect to use in the environment. The CSMS 102 provides advice based on real-time range and trending information (e.g., the average demand is increasing in the computing environment) that the user may use determine when to trigger an action.

The CSMS 102 analyzes static rules and provides dynamic rules that modify the static rule to meet the user's SLAs given the real-time state of the environment. The CSMS 102 determines a time to start a compute instance dynamic rule that dynamically adjusts when to turn on an instance and load data in order to meet a SLA (e.g., a user application may need to be available and running by 8 AM on Monday morning). The CSMS 102 provides adjustments to the time to start a compute instance rule to dynamically change throughout the day (e.g., because resource utilization may be distributed unevenly and include peaks at particular times of the day) depending on the real-time state of the environment and the real-time state of the resources the user is expected to use to achieve the user's SLA.

The CSMS 102 characterizes the long-term characteristic of the real-time and historical measurements, and the long-term impact of adjustments proposed by the CSMS 102. The CSMS 102 rule may include dynamically adjusting when a request is sent to start an instance, based on the historical and real-time state measurements, and the adjustment may occur throughout the day. For example, the decisions to scale up, and migrate to particular computing environments may be managed by dynamic rules that adjust throughout the day. The CSMS 102 determines the expected long-term characteristics of the dynamic rule to determine the impact to achieving the users SLAs.

For example, a dynamic rule adjustment may trigger that when a threshold is met that a dynamic action be performed (e.g., scale up, migrate, start an instance). The CSMS 102 may analyze the long-term average, so that while short-term measurements may advise that when capacity reaches 80% a new node is added, however the long-term average where on average the demand for environment resources are known, so that the CSMS 102 determines in the long run an expected number of nodes (e.g., 5 nodes) that may be required in order to achieve the users SLAs.

The CSMS 102 collects and stores data from the various monitoring agents distributed throughout the environment, and distills the data to identify particular statistical information and metrics that characterize the state of the environment. In an alternative implementation, the CSMS 102 may be configured to distill the data and store the identified statistical information and metrics that characterize the state of the environment (e.g., state characterization identifiers, both historical and real-time). The CSMS 102 may also distill from the statistical information and metrics particular state characterization identifiers to present to the user in a visualization, so that the user is able to comfortably and accurately assess the state of the environment with the least amount of information presented.

The CSMS 102 performs traffic routing analysis and calculates the shortest path, and/or the cheapest route for transmitting transferring data. The shortest path analysis is used to determine which resources to use. For example, if the user runs 3 applications that need compute resources, and 2 providers are available to choose. The CSMS 102 formulates this problem as a shortest path routing problem over a graph that at each step the CSMS 102 chooses between placing the application in the environment of provider 1 or 2. The weight of each edge is the cost or inverse quality of the application on resources of a respective provider. The dynamic rule determines which route to take, and the results from taking that route are incorporated into the decision analysis performed by the CSMS 102. The CSMS 102 may analyze multiple dynamic rule adjustments and the long-term behavior that corresponds to each of the dynamic rule adjustments, in determining which dynamic rule adjustment to make. The long-term behavior identifies the types of computing environment resource requirements the user may need. For example, the user may use the information provided by the CSMS 102 to make long-term capacity planning decisions, and determine the types of contracts to enter into with service providers.

Figure 11:
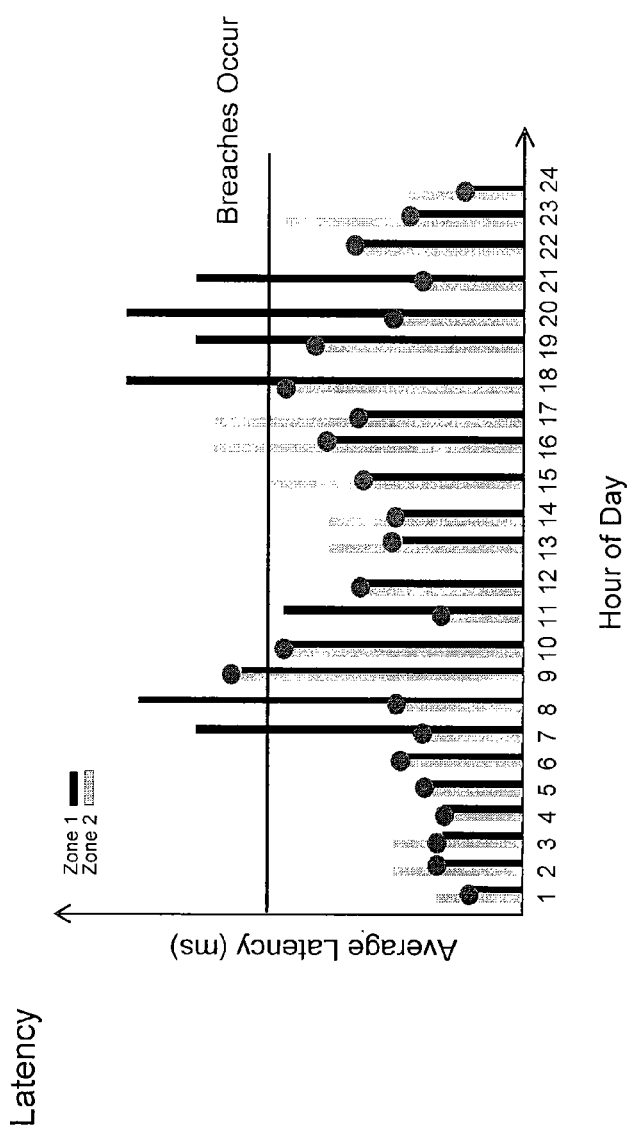
FIG. 11 shows latency decision factors using multiple zones.

FIG. 11 shows latency decision factors using multiple zones 1100. The CSMS 102 provides the user the ability to move away from fixed rule to dynamic rule based sourcing decisions making. The dynamic rule that is adjusted based on measuring real-time environmental conditions (e.g., the state of the environment, the characterization of the resources expected to be used by user, and the long-term resource characterization that results from the decision to use the dynamic adjustment).

Figure 12:
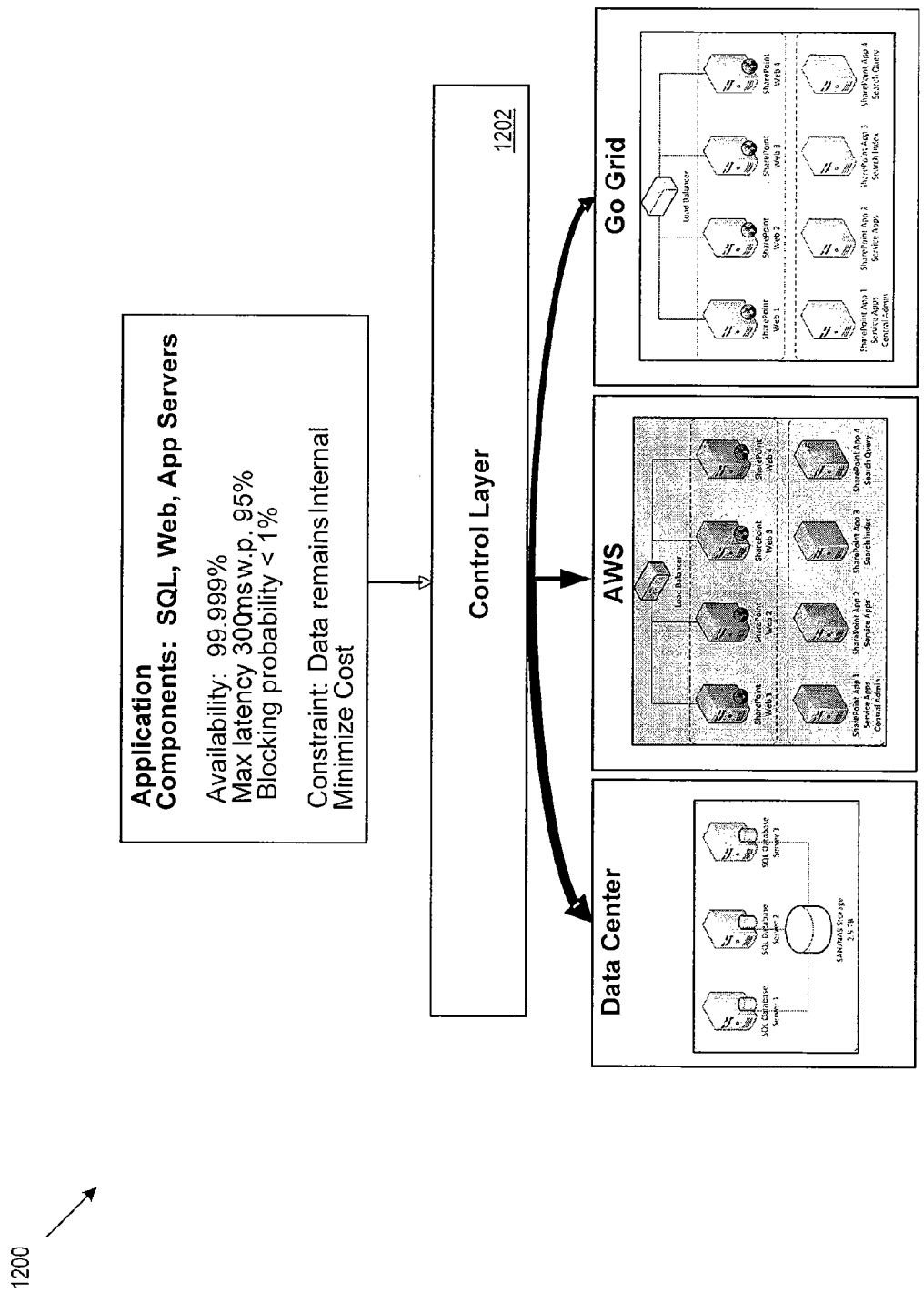
FIG. 12 shows a control layer extended by the service monitoring and dynamic rules.

FIG. 12 shows a control layer 1202 extended by the Service Monitoring and dynamic rules system and method. The CSMS 102 extends the traditional control layer tool 1202 to include analysis regarding the impact of implementation time and changing the underlying conditions of the available resources expected to be used to meet the user's SLAs. For example, the user has an application with a particular resource demand and quality of service requirements. Using a traditional control layer tools that monitors underlying attributes of various service providers (e.g., a data center, Amazon cloud, and GoGrid cloud), the control layer tools identifies what resources to buy, how much resources, and from what service provider to buy the resources. Traditional control layers use only historical measurements and assume resources are instantaneously available and procured. Traditional control layer tools assume static implementations, where a user's application is deployed with no expectation that the application will be migrated, scaled, or some other dynamic action taken in order to meet the SLA's for the application, or the results of migration, scaling, or other dynamic action apply instantaneously. However, such traditional control layers do not take into account the time to actually start and time to set up resources (e.g., the procurement time to acquire a requested resource). The CSMS 102 uses the real-time measurements to accurately identify the time to start, and accounts for the time to set up reflect the procurement time to acquire the resources and have the resources ready by a particular deadline. The CSMS 102 also determines the impact of demand and capacity changes that occur while we are waiting for the change to apply (e.g., time to start resources, or time to transfer data).

Figure 13:
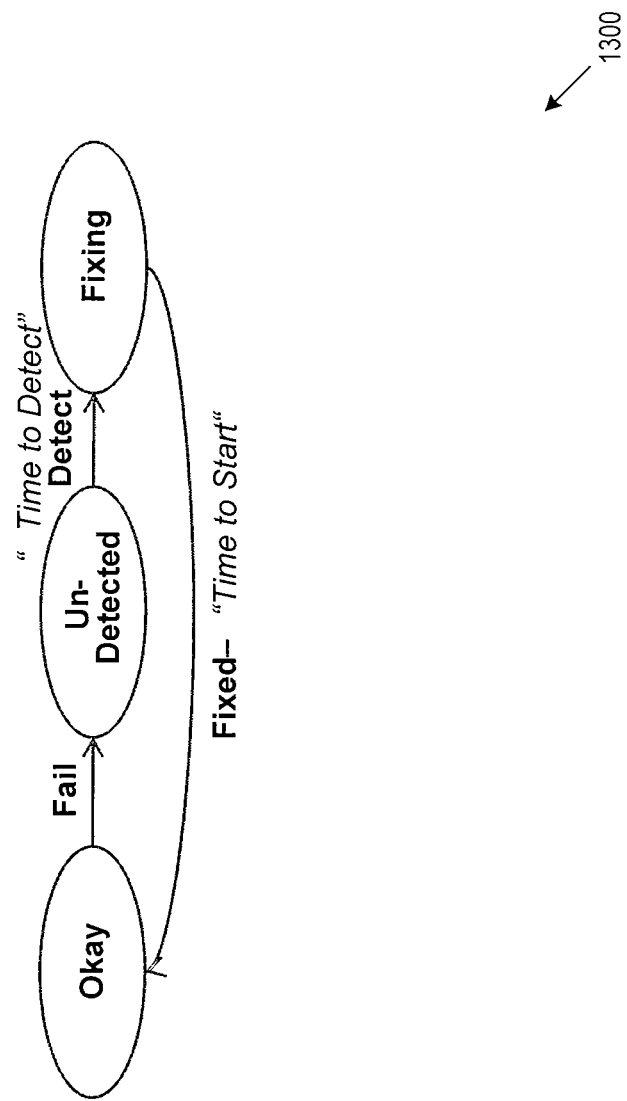
FIG. 13 shows a time to start analysis logic diagram.

FIG. 13 shows a time to start analysis logic diagram 1300 for a dynamic rule implements to meet the user's SLAs. For example, the time to start an instance varies slowly throughout the day (e.g., sample 30 minute granularity). Network Latency varies quickly (e.g., sample at 1 second granularity, once every 1 minute). FIG. 13 shows dependencies of an availability constraint, including the time to detect a failure, and the time to fix the failure (e.g., the time to fix may be considered the time to start a replica of an instance that is down to). The time to fix the failure is further dependent on the time to procure the resource and the time to setup the resource (e.g., service). A static rule may leverage a status (e.g., pulse), the CSMS 102 provides the user the option to improve 99.999% availability by implementing dynamic rules that detect a failure, procure an alternate service and setup the alternate service in advance of the failure, and or at the time of the failure. The user may augment an underlying service by replicating instances to execute concurrently so that where the service provides 99.900% availability for each of two independent instances, the user may consider the combined availability for the two independent instances to be 99.999% availability. However, the CSMS 102 provides the user with real-time state information and dynamic rules that may be configured to minimize the number of instances and only scale up when a failure is detected.

Modeling the time to start and latency, the CSMS 102 may use the sample mean and sample variance observed through active probing, and weigh the sample mean in a variety of ways across particular observations. For example, rather than applying a sample mean having equal weights across multiple observations, the CSMS 102 may weigh more heavily more recent samples. The CSMS 102 may use Chernof Bound, Chebyshev Bound, Markov Bound that rely on sample mean and sample variance to accurately provide an upper bound on the time to start and latency characteristics for the environment. The CSMS 102 may use a bound based on the assumption that the underlying variable has a Gaussian distribution, in which case the CSMS 102 may use a cumulative distribution function. The CSMS 102 may determine that the time to start exhibits a normal distribution with the particular sample mean and sample variance, however the observed time to start distribution may exhibit other distribution characteristic (e.g., or some distribution such as a Poisson distribution). The CSMS 102 may use the Chernof Bound and Chebyshev Bound to calculate the state of the environment based on the moment (the sample mean and sample variance). The CSMS 102 map the time to start and/or latency to the normal distribution (although collected measurements may be mapped to another distribution).

The CSMS 102 may use linear regression, linear least squared estimation (LLSE), and/or Kalman filter to determine the state characteristics of the service capacity of the environment. The CSMS 102 may use linear least squared estimation, when a random behavior is observed, to model the service capacity. The CSMS 102 uses the collected measurements to model random variables and/or normal random variables (Gaussian random variable) that characterize the random behavior of the service capacity of the environment. The CSMS 102 uses the mean and variance of the normal random variables to identify additional properties of the collected measurements to characterize the environment. The CSMS 102 may alternatively use the minimum mean square estimation.

Figure 14:
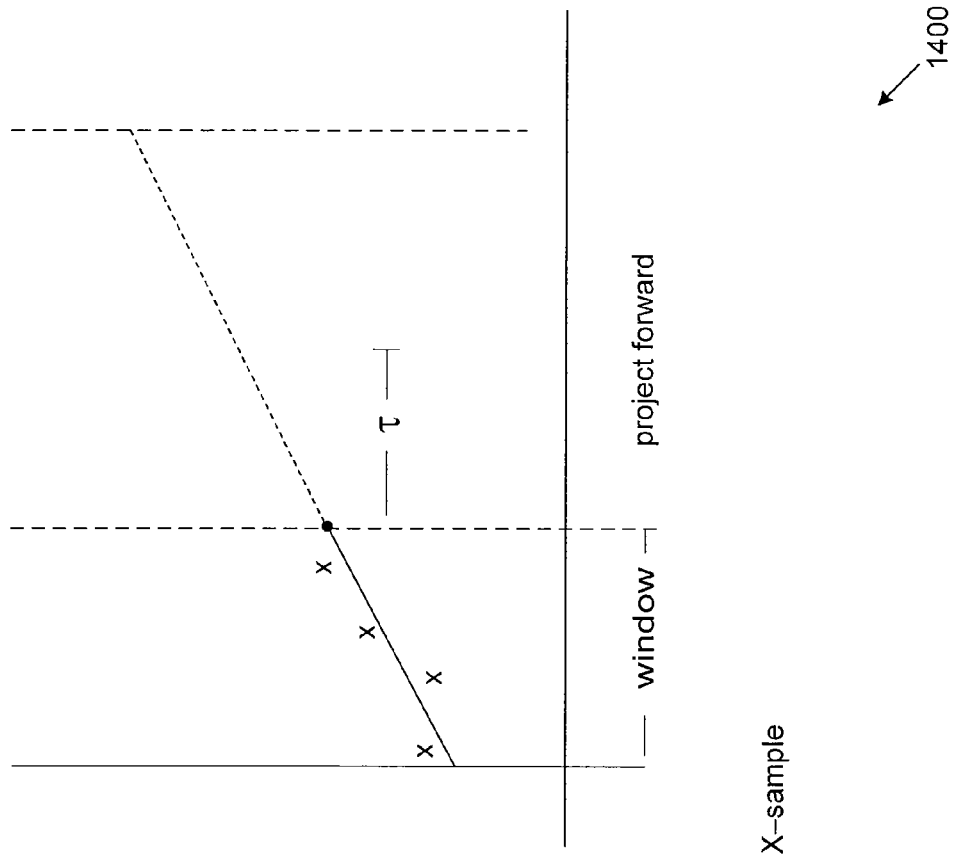
FIG. 14 shows an application of linear regression using the collected measurements.

As shown in FIG. 14, the CSMS 102 performs linear regression using the collected measurements to create a sample mean, sample variance, and sample covariance (e.g., to solve a best fit curve fitting exercise, solving an optimization problem) to accurately calculate the characterization of the service capacity for the environment.

The CSMS 102 may use the Kalman filter as another way to apply linear least square modeling to characterize the environment. The Kalman filter is a recursive construction of estimating the LLSE (e.g., instead of using all N samples (collected measurements), the CSMS 102 may use the most recent Nth sample and the value the CSMS 102 estimated using the past N−1 samples).

The CSMS 102 determines what measures to collect (e.g., service response, quality, accuracy, utilization, capacity, and demand) and how to analyze the collected measures (e.g., bounds, bounds and/or estimation). The CSMS 102 maps the collected real-time measurements to the appropriate model to determine state characteristics of the service quality and service response of the environment. Given the speed at which, and/or the frequency at which certain events occur in the environment (e.g., capacity availability changes, and/or demand changes), the CSMS 102 may use linear regression to determine the state characteristics of the service capacity of the environment. The time to start and/or latency may change less frequently in the environment, and the CSMS 102 may use the sample mean and the sample variance to determine state characteristics of the service response of the environment.

The CSMS 102 may use any number of approximation modeling tools including one-sided Chebyshev (see Table 6) and Gaussian approximation (see Table 7) to accurately model the time to start. The CSMS 102 determines the time to start an instance given a time that is greater than a threshold and less than a bounding parameter P. For example, the parameter P may be considered the blocking probability (e.g., used to determine when to scale to have enough capacity at a given time), or the deadline probability (e.g., a binary status where the resource is either available or not available in particular time) when a resource must be available, depending on the particular aspect of the time to start the CSMS 102 desires to model.

TABLE 6

One-sided Chebyshev

1) One-sided Chebyshev $$P_r(X \geq k\sigma + \mu) \leq \frac{1}{1+k^2} = P$$

$$\Rightarrow k = \sqrt{\frac{1}{P} - 1}$$

$$P_r(X \geq T) \text{ set } T = k\sigma + \mu \Rightarrow k = \frac{T-\mu}{\sigma}$$

$$\Rightarrow T = \mu + \sigma\sqrt{\frac{1}{P} - 1}$$

E.g., for $P = 0.0001 \approx \mu + \sigma \cdot 100$

Table 7 shows a Gaussian Approximation the CSMS 102 may use to accurately model the time to start.

TABLE 7

Gaussian Approximation

2) Gaussian Approximation $X \sim N(\mu, \sigma)$; Lot $Z \sim N(0, 1)$ $$P_r\left(\frac{(X - \mu_n)}{\sigma_n} > X\right) \approx \text{table}$$

| X | $P_r(Z > X)$ | $P_r(X > T)$ |
|---|---|---|
| 1.00 | 15.9% | |
| 1.64 | 5.0% | $= P_r\left(\frac{(X - \mu_n)}{\sigma_n}\right) > \left(\frac{(T - \mu_n)}{\sigma_n}\right)$ |
| 1.96 | 2.5% | |
| 2.00 | 2.27% | $\Rightarrow T = \sigma_n X + \mu_n$ |
| 2.58 | 0.5% | |
| 7.13 | $5 \cdot 10^{-13}$ | |

Figure 15:
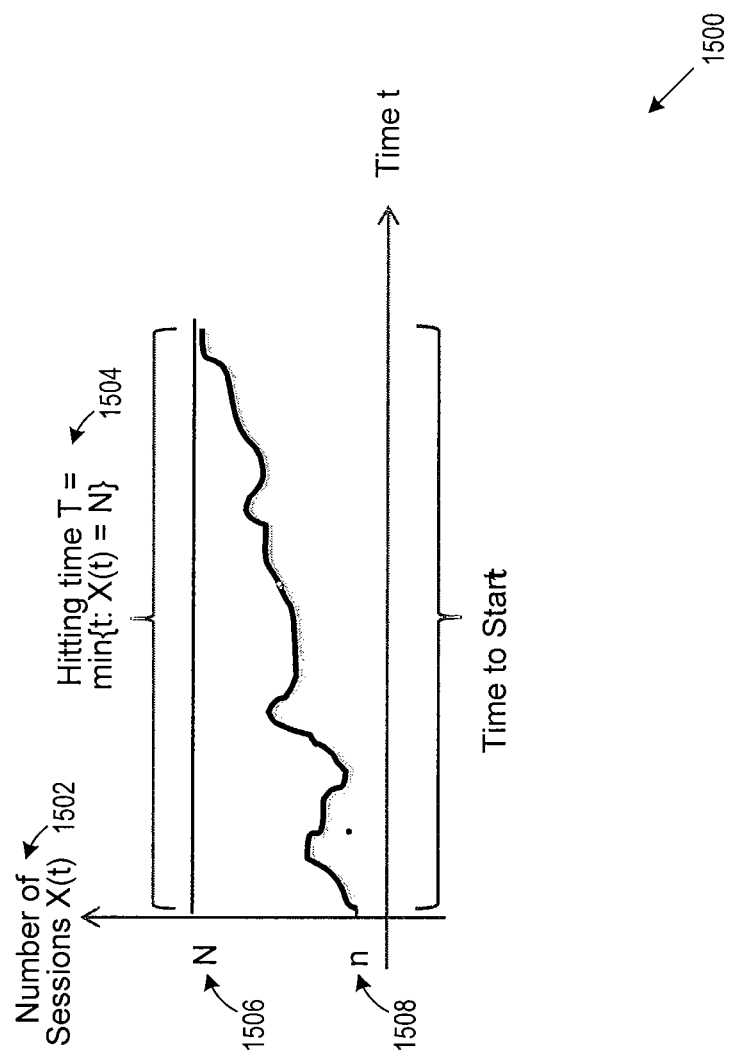
FIG. 15 shows demand as a function of the number of sessions requested and the time to start the sessions.

FIG. 15 shows demand 1500 as a function of the number of sessions 1502 requested and the time to start the sessions 1504, and the utilization is increasing. Applying the blocking probability, such that the probability that demand is within capacity and/or above a desired threshold, the CSMS 102 monitors the arrival rate and time to start to model demand over a period of time. The CSMS 102 provides the user a way to proactively provision capacity (e.g., choose N 1506 new machines to scale up, based on threshold n 1508) as needed as a function of the arrival rate (hitting time T 1504) of requests for new sessions (e.g., the velocity at which new requests arrive) and the time to start the new sessions. For example, the CSMS 102 may model the environment to determine adjustments to make to maintain probability (demand within provisioned)>99% or that the probability that any new session is blocked <0.1%.

Methods of setting N 1506 when utilization is increasing may be as follows. The CSMS 102 assumes the user's desire to maintain the utilization within some threshold, that demand is equally split over the number of machines so that any one machine sees a demand that is the fraction of overall demand (i.e., overall demand divided by the total number of machines). The CSMS 102 uses linear regression to estimate the trajectory of the change in utilization over the change in time for a single machine. The CSMS 102 determines whether to provision more machines by projecting the utilization of a single machine forward time T (the time to start and ready new machines) results in a lower than acceptable blocking probability. The CSMS 102 determines when to provision additional N 1506 machines so that the demand seen by one machine is small enough to maintain utilization within threshold.

The CSMS 102 may also determine N 1506 by assuming the user's desire to maintain an upper bound on the blocking probability (e.g., <0.1%), and use the setup as exampled above, but assume arrivals come in a random fashion modeled by the Poisson process (instead of a linear fashion as above). Let lambda denote the arrival rate seen by one machine (i.e., the overall rate divided over the total number of machines). The number of arrivals that occur in the next time T as seen by one machine can then be modeled via a Poisson distribution with mean lambda times T. The blocking probability bound is satisfied by satisfying that the number of arrivals that occurs is less than the current capacity. Using the cumulative distribution function (cdf) the CSMS 102 determines when to trigger the provisioning of additional machines. Using the cdf, the CSMS 102 determines the number of additional machines N to provision so that lambda is small enough to satisfy the bound. Alternatively, the CSMS 102 determines if the demand was decreasing or remaining stable so that the number of machines needed to satisfy the blocking probability constraint is less than the current number of machines. Scale down so that the number of machines satisfies the current demand. For example, if all nodes have the same capacity, the CSMS 102 may determine whether to shut down or decommission machines so that only ceiling (demand/capacity) are active.

Figure 16:
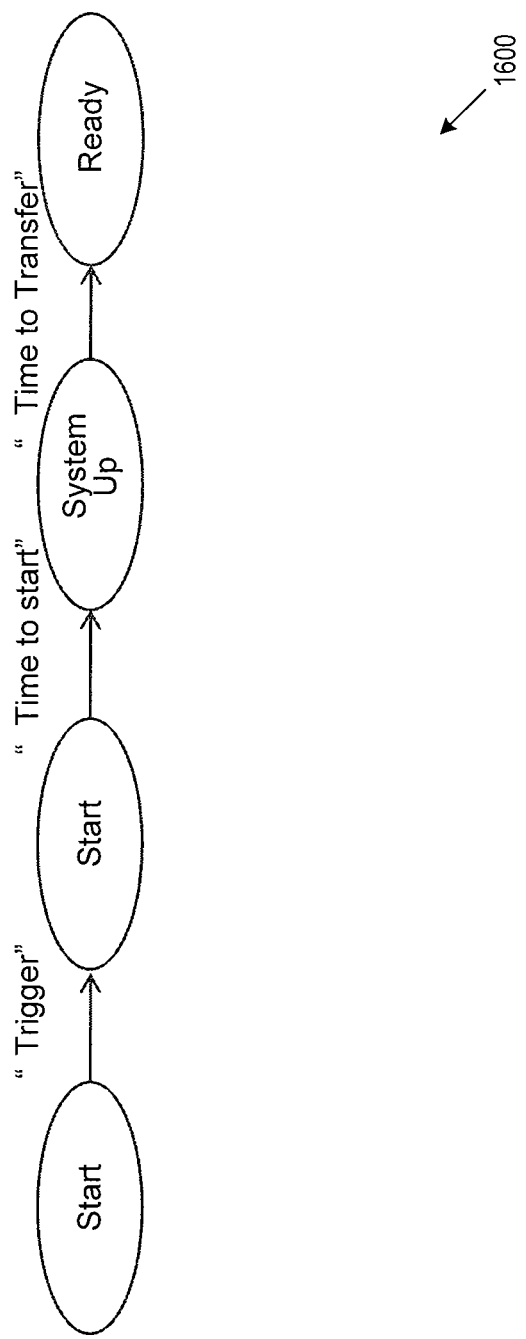
FIG. 16 shows a time to transfer a file logic diagram.

FIG. 16 shows a time to transfer a file logic diagram 1600. The CSMS 102 characterizes the time to transfer to determine the actual time to meet a user SLA (e.g., a deadline to maintain a probability a system is ready at a pre-specified deadline, 8 AM Monday). The CSMS 102 measures bandwidth, time-to-start an active probe instance, and updates the trigger of the time-to-start process to account for the time to set up and the time to transfer to ensure the resource request is made to meet the user's SLA.

The CSMS 102 may determine deadline time to ready by measuring the time-to-transfer-file and time-to-start-instance. The CSMS 102 determines a time to request a resource in order to be ready with probability P. Table 8 shows a way the CSMS 102 may determine deadline time to ready.

TABLE 8

Deadline time to ready

F—File size
P—Probability ready
Output: Start at T previous to be ready with probability P
Formulation: T = time-to-transfer-file + time-to-start-instance
 For each time t (e.g. hour in the day)
Time-to-start: Sample mean confidence interval 90% of time
 within [a, b]

The CSMS 102 may determine latency by measuring the delay through the network (and a application). The CSMS 102 may provide the average delay, and/or indicator whether transactions happen within delay D with probability P. Table 9 shows a way the CSMS 102 may determine latency.

TABLE 9

Latency

Figure 17:
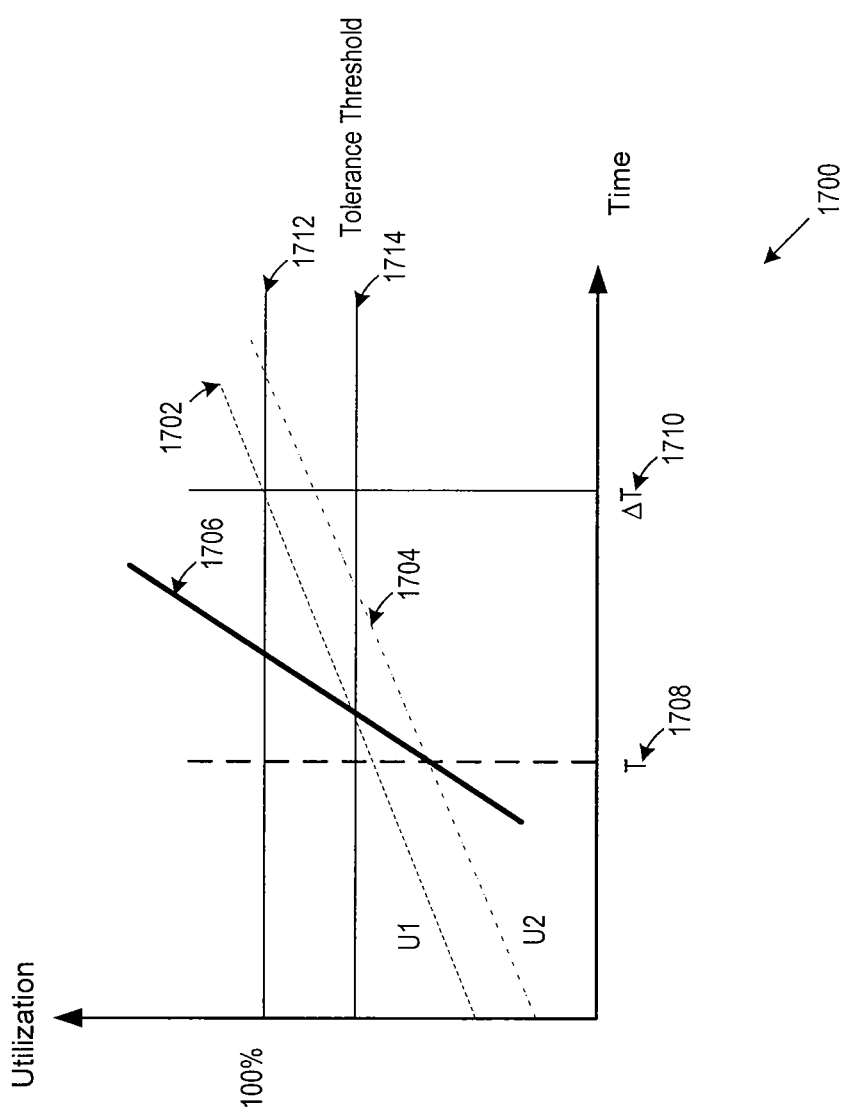
FIG. 17 shows the time-to-start as a function of utilization.

D = network delay (+ application delay)
 For each time t (e.g. hour in the day)
Network delay: Sample mean confidence
 interval P (e.g., 90%) of time within interval [a, b]
For multi-zone: Use the minimum delay FIG. 17 shows the time-to-start T as a function of utilization 1700. Utilization equals demand divided capacity at a series of time intervals (e.g., U1=D/X1, U2=D/X2, U1,2=D/(X1+X2), curves 1702, 1704, 1706). The CSMS 102 may determine demand based on the number of sessions, transactions per second, megabits per second, and throughput quality, and T refers to the time to start an instance, or time to start an instance including the time to transfer data and/or setup a resource. The CSMS 102 determines what resources to use and when to use the resources by monitoring demand and capacity of the environment and the resources used by the user. The CSMS 102 models utilization of resources based on multiple demand and capacity calculated utilization trajectories. In order to determine whether a particular utilization trajectory (e.g., U1 and U2) may model the average utilization may be satisfied by the resources of the environment at a particular time T 1708, the utilization trajectory (e.g., U1, and U2) is shifted in time (Δ T 1710) to determine whether the utilization exceeds 100% 1712 or a configurable threshold 1714 (e.g., where blocking may begin to occur or other service quality and service response degradations may also be experienced by the user). The CSMS 102 provides a threshold delta T that may account for uncertainty or confidence level regarding the accuracy of the calculation of the time to start. The user and/or system may use the threshold delta T to further refine the user's preferences and risk exposure. Alternatively, the utilization trajectory (e.g., U1 and U2) may model the worse case utilization in order to apply conservative measures.

Figure 18:
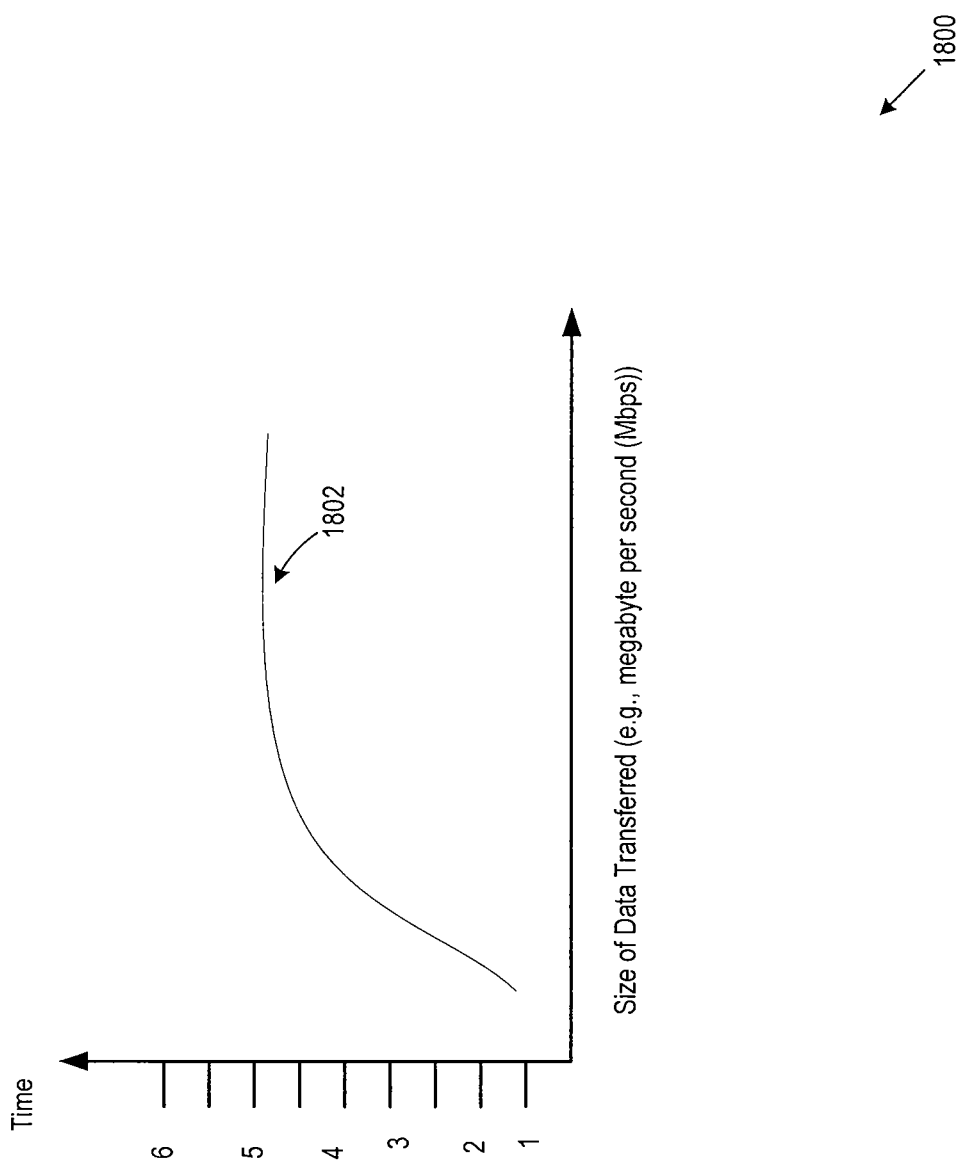
FIG. 18 shows how the CSMS may determine a time to transfer a file.

FIG. 18 shows how the CSMS may determine a time to transfer a file 1800. The CSMS 102 may determine a time to transfer a file of a particular size using a model. The CSMS 102 captures a table of file sizes and transfer rates to capture slow start characteristics over intervals of time, and maps (e.g., look-up sample mean based on) the file size to the interval to determine the time-to-transfer. For example, early transfer rate measurements are mapped to the model at particular intervals, and the CSMS 102 extrapolates an amount of data transferred during a later interval, and determines the desired file size to transfer maps to the later interval.

The CSMS 102 may sample the bandwidth of the environment by collecting measurements that characterize the time-to-transfer using a model that accurately models the resources expected to be used in the environment(s) for scaling and migrating. The CSMS 102 may measure goodput by sending a file via TCP to a configurable destination, and measuring the performance of the transfer until the TCP transfer stabilizes. TCP has a known property, where in the beginning TCP attempts to scale up the data transfer quickly to discover the available throughput (goodput) of the bandwidth of the environment, and then stabilizes (1802) at a balance ratio of data transferred to available throughout. For example the change within percentages or megabits per second (Mbps). Alternatively, the CSMS 102 measures goodput by collecting, at configurable intervals, the amount of data transferred (e.g., 1 second intervals the system determines how much data is transferred, 77 megabytes (MB), 84, 43, 34, 33, 32, and stabilizes around 33). The CSMS 102 models the size of the traffic transfer while performing the file transfer measurement collection. The CSMS 102 uses the time-to-transfer model to advise the user regarding selectable action, and/or dynamically adjust a dynamic rule to meet the user's SLA (e.g., service response). The CSMS 102 may use the time-to-transfer, as well as other service quality and service response analysis to calculate predictable performance outcomes at the CSMS 102 translates into dynamic adjustments used to acquire and use resources to meet the user's SLA.

The CSMS 102 may leverage existing rules engine, and monitoring and automation instrumentation. The disclosure adds a monitoring database for collecting the needed measures, and then an optimization engine that translates the needed rule to meet a business objective in the measured state of the cloud. The updated rule is reflected in the rules engine. Most current measurements and adjustments are made via fixed threshold and actions. I.e., regardless of the state of the cloud or demand, operations when automated use fixed rules and alerts. Some work exists that monitors conditions and alerts or triggers when behavior "deviates from the norm," but fails to take into account the operations implications. E.g., the network bandwidth doubling is not important on its own, unless taken into account with the need to transfer a file or perform a backup within a time window. Rather than a fixed rule that does not relate to a business level objective, this work calibrates business level objectives based on the state of the cloud. Current rules for automation in data centers rely on fixed thresholds and actions, e.g., always trigger at 80% utilization, or always start a process 1 hour prior to scheduled start. Instead, this work uses monitoring to adjust the thresholds and actions of the alerts and rules. Operations are dynamically tuned based on measured resource utilization, application/user demand, and the implementation of other operations.

Figure 19:
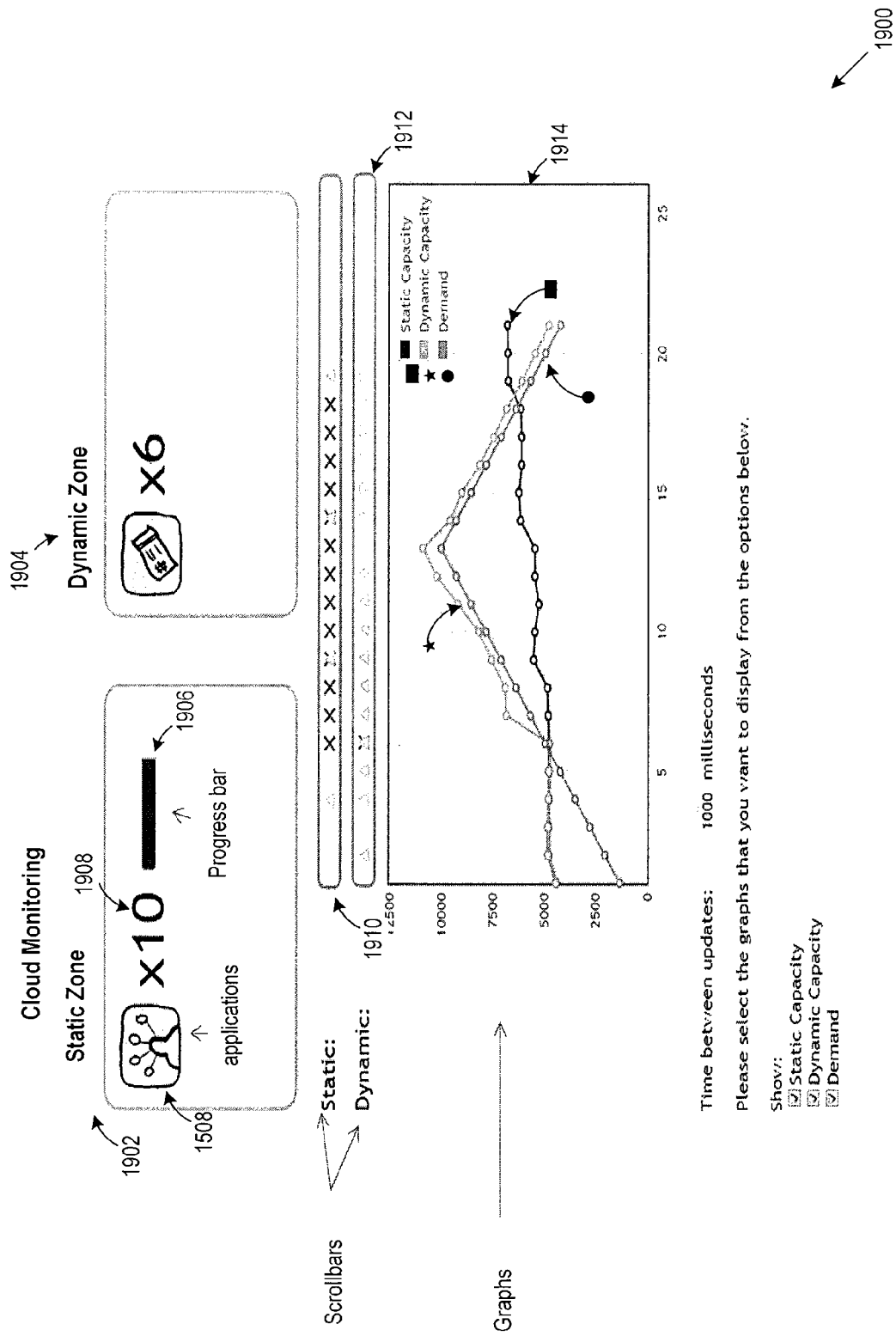
FIG. 19 shows a visualization presented by CSMS to the user.

FIG. 19 shows a visualization 1900 presented by CSMS 102 to the user. The visualization 1900 shows how measurements impact with real-time actions that combine to meet the user's SLAs and application demands. The CSMS 102 may present the collection of measurements to the user as a visualization that graphically indicates the state of the environment, and the user's expected performance results to be realized when the dynamic rules are implemented. FIG. 19 shows a static zone 1902 that includes instances procured under the static rule, and a dynamic zone 1904 that includes instances procured under the dynamic rule. The progress bar 1906 indicates the progress of an instance starting. When the progress bar 1906 indicates completion, the count 1908 increases by 1 (e.g., x10 would update to x11). The static zone scrollbar 1910, and dynamic zone scrollbar 1912 indicate the execution progress of the rules in the respective zones. The CSMS 102 may use graphical indicators (e.g., up triangle, red cross, and down triangle) to indicate various events. The up triangle indicates that an instance is starting, the red cross indicates when demand breaches capacity, and the down triangle indicates when an instance is stopping. The graphical area 1914 shows the level of demand, the capacity level under static rules, and the capacity level under dynamic rules. The graph 1912 shows that the level of demand increases, then decreases. The capacity under dynamic rules follows the changes in the level of demand. In contrast, the capacity under static rules undershoots the demand and then overshoots the demand. The CSMS 102 monitors the level of demand, and at time intervals, the rule evaluates whether to start a new instance, stop an instance, or do nothing. An example of a static rule is: If the user is above 90% utilization, start an instance. If the user is below 10% utilization, stop an instance. Otherwise, do nothing. In contrast, a dynamic rule accounts for the trajectory of demand growth and historical data to estimate whether to start an instance, stop an instance, or do nothing. If a rule decides to start an instance, an up arrow appears in the "scrollbar" 1910. A progress bar 1906 appears in the corresponding zone (1902, 1904), and once the progress bar fully loads, the number of apps increases by one. In contrast, if a down arrow appears in the "scrollbar" 1910, the count 1908 decreases by one immediately.

FIG. 1 is a block diagram 100 of a general computer system that may be used in a CSMS 102 system configuration 100. In a networked deployment, the computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 104, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory 106 that can communicate via a bus. The memory may be a main memory, a static memory, or a dynamic memory. The memory 106 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the CSMS 102 memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the CSMS 102.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface 108. The communication interface 108 may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A computer-implemented method for cloud services monitoring (CSM), comprising:
    identifying, with a processor, a service level agreement (SLA) rule to execute to meet a SLA requirement for a user of cloud resources provided by a cloud computing environment, the SLA rule being accessed by the processor using a network, where the SLA rule is further configured to comprise:
        a time-to-request, wherein the time-to-request is an amount of time in advance of a request for a selected cloud resource to request the selected cloud resource among the cloud resources, and
        a time-to-start for a computing instance, wherein the time-to-start is an amount of time in advance of a request for the computing instance to start the computing instance that executes in the cloud computing environment;
    observing, using the processor connected to the network, the cloud computing environment to collect state information;
    identifying a mathematical model that models the behavior of the observed cloud computing environment by using the processor to apply the model to the collected state information;
    determining, using the processor to apply the model to the collected state information, when the state information indicates that the cloud computing environment is at risk of not meeting the SLA requirement, and
    based on a determination of a risk of not meeting the SLA requirement, adjusting the SLA rule to improve the probability that the cloud computing environment will meet the SLA requirement, wherein adjusting the SLA rule includes adjusting the time-to-request, the time-to-start or both.

2. The method of claim 1, where observing comprises:
    obtaining, using the network, passive state information provided by the cloud computing environment; and
    obtaining, using the network, detected state information by probing the cloud computing environment.

3. The method of claim 1, where observing comprises:
    obtaining a measurement of network delay, or bandwidth of the cloud computing environment, or both, by:
        sending via the network a file transfer service request to the cloud computing environment for a file of known size to transfer from a first CSM instance to a second CSM instance located at known locations;
        receiving via the network a result of the file transfer service request;
        calculating the measurement of network delay, or the bandwidth of the cloud computing environment, or both based on the result of the file transfer service request;
    wherein the amount of time to start is based on a desired time when a resource is expected to be available to meet the SLA requirement,
    wherein the desired time when the resource is expected to be available is greater than a threshold to start value added to the amount of time to start, and
    wherein a threshold delta T is used to adjust the threshold to start value based on a confidence level that the time-to-start is accurate.

4. The method of claim 1, where observing comprises:
    obtaining a measurement of time-to-start of a computing instance that executes in the cloud computing environment, or spot price for any of the cloud resources used to meet the SLA, or both;
    wherein the amount of time to start is based on a desired time when a resource is expected to be available to meet the SLA requirement,
    wherein the desired time when the resource is expected to be available is greater than a threshold to start value added to the amount of time to start, and
    wherein a threshold delta T is used to adjust the threshold to start value based on a confidence level that the time-to-start is accurate.

5. The method of claim 1, where adjusting the SLA rule comprises:
changing the SLA rule to have a different time-to-request a selected cloud resource among the cloud resources by communicating the SLA rule change to an orchestration tool connected, via the network, to the cloud computing environment, where the orchestration tool implements the SLA rule change;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

6. The method of claim 1, where adjusting the SLA rule comprises:
changing the SLA rule to have a different time-to-start for a computing instance that executes in the cloud computing environment;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

7. The method of claim 1, where adjusting the SLA rule comprises:
changing the SLA rule to direct a portion of cloud computing workload for the user to a different cloud computing environment.

8. A product for cloud services monitoring (CSM), comprising:
a computer readable memory with processor executable instructions stored thereon, wherein the instructions when executed by the processor cause the processor to:
identify a service level agreement (SLA) rule configured to execute in order to meet a SLA requirement for a user of cloud resources provided by a cloud computing environment, where the SLA rule is further configured to comprise:
a time-to-request, wherein the time-to-request is an amount of time in advance of a request for a selected cloud resource to request the selected cloud resource among the cloud resources, and
a time-to-start for a computing instance, wherein the time-to-start indicates an amount of time in advance of a request for the computing instance to start the computing instance that executes in the cloud computing environment;
observe the cloud computing environment to determine state information for the cloud computing environment; and
determine when the state information indicates that the SLA requirement is at risk of not meeting the SLA requirement, and in response,
adjust the SLA rule to improve the probability that the cloud computing environment will meet the SLA requirement, wherein adjusting the SLA rule includes adjusting the time-to-request, the time-to-start or both.

9. The product of claim 8, wherein the instructions further cause the processor to:
obtain passive state information directly provided by the cloud computing environment; and
obtain detected state information by probing the cloud computing environment.

10. The product of claim 8, wherein the instructions further cause the processor to:
obtain a measurement of network delay, or bandwidth of the cloud computing environment, or both;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

11. The product of claim 8, wherein the instructions further cause the processor to:
obtain a measurement of time-to-start of a computing instance that executes in the cloud computing environment, or spot price for any of the cloud resources used to meet the SLA, or both.

12. The product of claim 8, wherein the instructions further cause the processor to:
change the SLA rule to have a different time-to-request a selected cloud resource among the cloud resources;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

13. The product of claim 8, wherein the instructions further cause the processor to:
change the SLA rule to have a different time-to-start for a computing instance that executes in the cloud computing environment;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

14. The product of claim 8, where the instructions further cause the processor to:
change the SLA rule to direct a portion of cloud computing workload for the user to a different cloud computing environment.

15. A computer system for cloud services monitoring (CSM), comprising:
a processor;
a database in communication with the processor that stores SLA requirements for a user and corresponding SLA rules associated with the SLA requirements;
a memory coupled to the processor, wherein the memory comprises:

processor executable instructions stored thereon, wherein the instructions when executed by the processor cause the processor to:

identify a service level agreement (SLA) rule configured to execute in order to meet a SLA requirement for a user of cloud resources provided by a cloud computing environment, where the SLA rule is further configured to comprise:
- a time-to-request, wherein the time-to-request is an amount of time in advance of a request for a selected cloud resource to request the selected cloud resource among the cloud resources, and
- a time-to-start measurement for a computing instance, wherein the time-to-start measurement indicates an amount of time in advance of a request for the computing instance to start the computing instance that executes in the cloud computing environment;

observe the cloud computing environment to determine state information for the cloud computing environment; and determine when the state information indicates that the SLA requirement is at risk of not meeting the SLA requirement, and an SLA controller in communication with the database which adjusts the SLA rule to improve the probability that the cloud computing environment will meet the SLA requirement when the system determines that the SLA requirement is at risk of not meeting the SLA requirement, wherein adjusting the SLA rule includes adjusting the time-to-request, the time-to-start or both.

16. The system of claim 15, where the system comprises one or more CSM instances, located in the network, that observe the environment to obtain detected state information by probing the cloud computing environment,
wherein each the CSM instance is configured to send a resource request to a resource in the cloud computing environment and receive a response to resource request, and wherein the system, via a communications interface, obtains passive state information directly provided by the cloud computing environment;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

17. The system of claim 15, where the system comprises one or more CSM instances, located in the network, that observe the environment to obtain a measurement of network delay, or bandwidth of the cloud computing environment, or both;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

18. The system of claim 15, where the system comprises one or more CSM instances, located in the network, that observe the environment to obtain a measurement of time-to-start of a computing instance that executes in the cloud computing environment, or spot price for any of the cloud resources used to meet the SLA, or both;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

19. The system of claim 15, where the SLA controller adjusts the SLA rule via the network by communicating the adjustment to an orchestration tool connected to the cloud computing environment, where the orchestration tool implements the SLA rule change so that the SLA rule has a different time-to-request a selected cloud resource among the cloud resources;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

20. The system of claim 15, where the SLA controller adjusts the SLA rule via the network by communicating the adjustment to an orchestration tool connected to the cloud computing environment, where the orchestration tool implements the SLA rule change so that the SLA rule has a different time-to-start for a computing instance that executes in the cloud computing environment;
wherein the amount of time to start is based on a desired time when a resource is expected to be available to meet the SLA requirement,
wherein the desired time when the resource is expected to be available is greater than a threshold to start value added to the amount of time to start, and
wherein a threshold delta T is used to adjust the threshold to start value based on a confidence level that the time-to-start is accurate.

21. The system of claim 15 where the SLA controller adjusts the SLA rule via the network by communicating the adjustment to an orchestration tool connected to the cloud computing environment, where the orchestration tool implements the SLA rule change so that the SLA rule directs a portion of cloud computing workload for the user to a different cloud computing environment.

* * * * *